US011550620B2

(12) United States Patent
Persson et al.

(10) Patent No.: US 11,550,620 B2
(45) Date of Patent: Jan. 10, 2023

(54) TASK DISPATCH

(71) Applicant: Arm Limited, Cambridge (GB)

(72) Inventors: Håkan Lars-Göran Persson, Skåne (SE); Frederic Claude Marie Piry, Cagnes-sur-Mer (FR); Matthew Lucien Evans, Cambridge (GB); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 21 days.

(21) Appl. No.: 17/190,729

(22) Filed: Mar. 3, 2021

(65) Prior Publication Data
US 2022/0283847 A1    Sep. 8, 2022

(51) Int. Cl.
*G06F 9/48* (2006.01)
*G06F 12/10* (2016.01)
*G06F 9/30* (2018.01)
*G06F 9/38* (2018.01)

(52) U.S. Cl.
CPC ........ *G06F 9/4843* (2013.01); *G06F 9/30098* (2013.01); *G06F 9/3851* (2013.01); *G06F 9/4812* (2013.01); *G06F 12/10* (2013.01)

(58) Field of Classification Search
CPC ...... G06F 9/4812; G06F 9/4843; G06F 12/10; G06F 9/30098; G06F 9/3851
See application file for complete search history.

(56) References Cited

U.S. PATENT DOCUMENTS

| 10,534,730 | B1* | 1/2020 | Nadarajah | G06F 21/78 |
| 2003/0023808 | A1* | 1/2003 | Bakke | G06F 11/1666 |
| | | | | 711/E12.017 |
| 2018/0267722 | A1* | 9/2018 | Emma | G06F 3/0619 |
| 2019/0042120 | A1* | 2/2019 | Kajigaya | G06F 12/12 |

* cited by examiner

*Primary Examiner* — Zachary K Huson
(74) *Attorney, Agent, or Firm* — Nixon & Vanderhye P.C.

(57) ABSTRACT

Apparatuses and methods are disclosed for performing data processing operations in main processing circuitry and delegating certain tasks to auxiliary processing circuitry. User-specified instructions executed by the main processing circuitry comprise a task dispatch specification specifying an indication of the auxiliary processing circuitry and multiple data words defining a delegated task comprising at least one virtual address indicator. In response to the task dispatch specification the main processing circuitry performs virtual-to-physical address translation with respect to the at least one virtual address indicator to derive at least one physical address indicator, and issues a task dispatch memory write transaction to the auxiliary processing circuitry comprises the indication of the auxiliary processing circuitry and the multiple data words, wherein the at least one virtual address indicator in the multiple data words is substituted by the at least one physical address indicator.

20 Claims, 11 Drawing Sheets

TASK DISPATCH

TECHNICAL FIELD

The present disclosure relates to data processing. In particular, the present disclosure relates to task dispatch from main processing circuitry to auxiliary processing circuitry.

DESCRIPTION

In a data processing system, a data processing apparatus which comprises main processing circuitry for performing data processing operations may be capable of delegating certain tasks to auxiliary processing circuitry. This reduces the processing burden on the main processing circuitry. Indeed the auxiliary processing circuitry may be configured to be particularly efficient at performing certain specialised data processing tasks and it may therefore be desirable for the data processing system as a whole for the main processing circuitry frequently to delegate such specialised data processing tasks to the auxiliary processing circuitry. However the process of delegation itself should then also be efficient, such that complexities of the process of delegation do not detract from the benefits of task delegation.

SUMMARY

One example described herein is an apparatus comprising:
main processing circuitry responsive to user-specified instructions to perform data processing operations; and
an interconnect interface for connecting the main processing circuitry to an interconnect via which the main processing circuitry can communicate with memory,
wherein the user-specified instructions comprise a task dispatch specification, the task dispatch specification comprising:
an indication of auxiliary processing circuitry, wherein the auxiliary processing circuitry is external to the main processing circuitry and is connected to the interconnect; and
multiple data words defining a task to be carried out by the auxiliary processing circuitry, wherein the multiple data words comprise at least one virtual address indicator,
wherein the main processing circuitry is responsive to the task dispatch specification:
to perform virtual-to-physical address translation with respect to the at least one virtual address indicator to derive at least one physical address indicator; and
to issue a task dispatch memory write transaction via the interconnect interface, wherein the task dispatch memory write transaction comprises:
the indication of the auxiliary processing circuitry; and
the multiple data words, wherein the at least one virtual address indicator in the multiple data words is substituted by the at least one physical address indicator.

One example described herein is a method comprising:
performing data processing operations in main processing circuitry in response to user-specified instructions,
wherein the user-specified instructions comprise a task dispatch specification, the task dispatch specification comprising:
an indication of auxiliary processing circuitry, wherein the auxiliary processing circuitry is external to the main processing circuitry and is connected to the processing circuitry via an interconnect; and
multiple data words defining a task to be carried out by the auxiliary processing circuitry, wherein the multiple data words comprise at least one virtual address indicator;
and in response to the task dispatch specification:
performing virtual-to-physical address translation with respect to the at least one virtual address indicator to derive at least one physical address indicator; and
issuing a task dispatch memory write transaction via the interconnect, wherein the task dispatch memory write transaction comprises:
the indication of the auxiliary processing circuitry; and
the multiple data words, wherein the at least one virtual address indicator in the multiple data words is substituted by the at least one physical address indicator.

One example described herein is an interconnect for connecting main processing circuitry to auxiliary processing circuitry,
wherein the interconnect is arranged to convey to the auxiliary processing circuitry a task dispatch memory write transaction issued by the main processing circuitry, wherein the task dispatch memory write transaction comprises:
an indication of the auxiliary processing circuitry; and
multiple data words defining a task to be carried out by the auxiliary processing circuitry, wherein the multiple data words comprise at least one physical address indicator,
wherein the interconnect is responsive to the task dispatch memory write transaction, when the at least one physical address indicator is comprised in write data to be written to a target location which is read-accessible, to reject the task dispatch memory write transaction.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
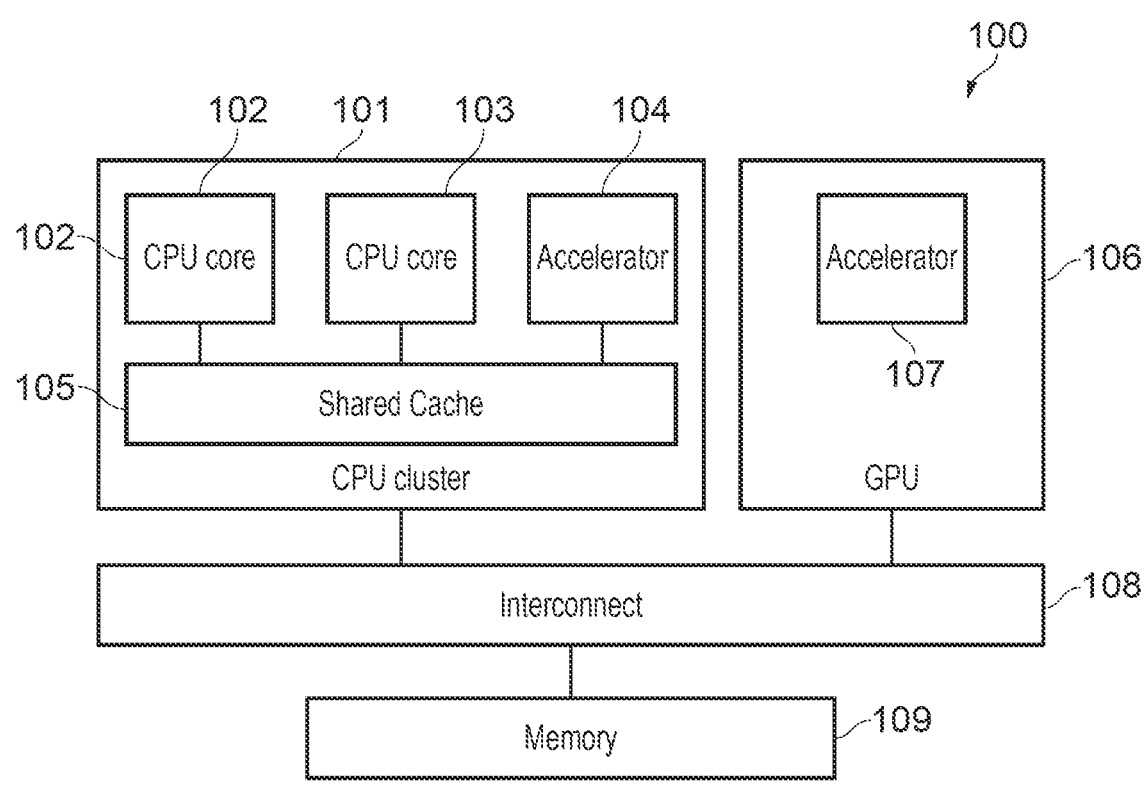
FIG. 1 schematically illustrates an example data processing system.

Before discussing the embodiments with reference to the accompanying figures, the following description of embodiments is provided.

In accordance with one example configuration there is provided an apparatus comprising:

main processing circuitry responsive to user-specified instructions to perform data processing operations; and an interconnect interface for connecting the main processing circuitry to an interconnect via which the main processing circuitry can communicate with memory, wherein the user-specified instructions comprise a task dispatch specification, the task dispatch specification comprising:

an indication of auxiliary processing circuitry, wherein the auxiliary processing circuitry is external to the main processing circuitry and is connected to the interconnect; and multiple data words defining a task to be carried out by the auxiliary processing circuitry, wherein the multiple data words comprise at least one virtual address indicator, wherein the main processing circuitry is responsive to the task dispatch specification:

to perform virtual-to-physical address translation with respect to the at least one virtual address indicator to derive at least one physical address indicator; and to issue a task dispatch memory write transaction via the interconnect interface, wherein the task dispatch memory write transaction comprises:

the indication of the auxiliary processing circuitry; and the multiple data words, wherein the at least one virtual address indicator in the multiple data words is substituted by the at least one physical address indicator.

The main processing circuitry (e.g. a CPU in a data processing system) may make use of the task dispatch memory write transaction as a mechanism to delegate data processing tasks to the auxiliary processing circuitry. When this auxiliary processing circuitry is provided with the explicit purpose of handling a specific type of data processing, it may be referred to as an "accelerator". In particular, the mechanism provided may be considered to comprise a "large write" transaction targeting the auxiliary processing circuitry, where here the "large" nature of the write transaction refers to the multiple data words forming part of the write transaction. Moreover, where the main processing circuitry is arranged to perform virtual-to-physical address translation on at least one virtual address indicator comprised in at least one of the multiple data words, the security of this translation process, and by extension the security of the task dispatch mechanism provided, can be arranged to remain under the control of a trusted system element. As a result user space processes making use of the task dispatch specification in the user-specified instructions to be executed are provided with a simple mechanism to delegate tasks to subordinate system components, such as accelerators. A subordinate system component which is the recipient of this large write transaction only receives permitted information, in particular physical address information of one or more memory regions to which it is allowed access, and therefore delegation of data processing tasks to such subordinate system components and their operations does not present a security concern. In turn, this allows a large degree of flexibility in the development and provision of the auxiliary processing circuitry, where for example a system may be constructed comprising main processing circuitry provided by a first development partner and auxiliary processing circuitry provided by a second development partner, whereby the both partners can develop their components relatively independently, without concerns about system security vulnerabilities arising.

Furthermore, the low overhead of invoking the task delegation mechanism means that its use is particularly beneficial in the context of smaller jobs being delegated, since the benefit of dispatching a smaller task to the auxiliary processing circuitry is not outweighed by the procedural cost of using this mechanism. Prior art techniques for submitting work to an accelerator are generally based on one of two main approaches: either by making use of kernel device driver register writes to peripheral registers; or by adding a work item to a user mode queue in memory and (if required) also writing to a peripheral doorbell register (which may be mapped into the user mode process). These prior art techniques require extensive set up for use, such as the definition of the system memory management unit (sMMU) tables and context to use, which can lead to high complexity and high overhead, in particular when virtualization is employed. Also in the prior art completion of the delegated task is typically signalled through an interrupt (IRQ) or by means of the CPU polling a memory location. By contrast the present techniques present a mechanism with a very low job submission overhead, allowing the main processing circuitry to submit tasks to the auxiliary processing circuitry (e.g. an accelerator) directly from a user space process and without a slow path which traps into a kernel device driver. Indeed a device driver is only involved when the main processing circuitry is initially discovering the auxiliary processing circuitry (e.g. an accelerator) and is consequently relatively simple. There is no device driver in the auxiliary circuitry use path. Further, no special software is needed to support virtualization and no intervention in the sMMU (configuration or setup) is required to make use of the auxiliary processing circuitry. In sum, a simplified and standardized way of allowing main processing circuitry to delegate processing tasks to auxiliary processing circuitry is provided, allowing data processing systems to be developed that include a variety of auxiliary processing circuitry, without this imposing an associated burden of complexity on the main processing circuitry. The standardization of the interface to access such auxiliary processing circuitry supports software being optimised for the use of such auxiliary processing circuitry.

In some embodiments the task dispatch specification specifies a plurality of registers associated with the main processing circuitry and wherein the main processing circuitry is responsive to the task dispatch specification to perform the virtual-to-physical address translation on content of a subset of the plurality of registers. Accordingly the content of registers associated with the main processing unit may be used to generate the task dispatch memory write transaction on the basis of the task dispatch specification, enabling the task dispatch specification to be efficiently expressed (e.g. within an instruction defining the parameters of the task dispatch specification), yet also providing flexibility and security with regard to the content of the task dispatch memory write transaction, in particular with respect to the at least one virtual address indicated which is subjected to the virtual-to-physical address translation.

In some embodiments a multiplicity of the plurality of registers is dependent on at least one of: an immediate value specified in the task dispatch specification; content of a multiplicity definition register specified in the task dispatch specification; a bitmask indicated by the task dispatch specification; and an enumerated set of options for the multiplicity, wherein the task dispatch specification specifies one of the enumerated set of options. The specific number of registers in the plurality of registers associated with the main processing unit which is employed for this purpose may or may not vary depending on the embodiment, and may be variously defined. This specification may be achieved in a variety of ways, such as by means of an immediate value in the task dispatch specification (e.g. within an instruction defining the task dispatch specification), from a register specified for this purpose, using a bit mask given by the task dispatch specification (which selects between various predefined alternatives, e.g. to indicate within a set of registers which should be used and which should not be used), or another enumeration of a predefined set of options.

Furthermore, the particular subset the registers which are then subjected to the virtual-to-physical address translation can similarly be specified and there are some embodiments, wherein a size of the subset of the plurality of registers which is subjected to the virtual-to-physical address translation is specified in the task dispatch specification.

Similarly to the definition of the multiplicity of the plurality of registers, the size of subset of the plurality of registers may vary in some embodiments (though in others it does not) and this specification may also be achieved in a similar variety of ways, i.e. an immediate value, from the content of a register, and these can represent a number, a bit mask, or an enumeration of a set of options. Hence there are some embodiments wherein the size of the subset of the plurality of registers is dependent on at least one of: an immediate value specified in the task dispatch specification; content of a multiplicity definition register specified in the task dispatch specification; a bitmask indicated by the task dispatch specification; and an enumerated set of options for the multiplicity, wherein the task dispatch specification specifies one of the enumerated set of options.

There are some embodiments wherein the at least one virtual address indicator is at least one virtual address pointer and the task dispatch specification comprises a specification of a size of at least one memory region referenced by the at least one virtual address pointer. This provides a further degree of flexibility to the specification of the task being dispatched, in that an arbitrarily sized portion of memory may by this mechanism be indicated to the auxiliary processing circuitry to be the subject of the delegated data processing.

Furthermore, similarly to the definition of the multiplicity and/or the size of the subset of the plurality of registers, a variety of techniques may be used for the specification of the size of at least one memory region referenced by at least one virtual address indicator in the multiple data words comprised in the task dispatch specification. These may thus include an immediate value, a value taken from the content of a register, or selection given by a bit mask, or an enumeration of a set of options. Thus there are some embodiments, wherein the specification of the size of the memory region referenced by the at least one virtual address pointer comprises at least one of: an immediate value specified in the task dispatch specification; content of a memory region size specification register specified in the task dispatch specification; a bitmask indicated by the task dispatch specification; and an enumerated set of options for the size, wherein the task dispatch specification specifies one of the enumerated set of options.

There are some embodiments, wherein when the at least one memory region comprises a multi-page memory region which crosses at least one virtual memory page boundary, the virtual-to-physical address translation generates more than one physical address page indication corresponding to the multi-page memory region, and the task dispatch memory write transaction comprises the more than one physical address page indication. Accordingly, the present techniques support the translation of a virtual address indicator, which crosses one or more page boundaries. In some cases this may result from the above-mentioned consideration of the size of the memory region referred to, resulting in several physical pages being translated and communicated to the auxiliary processing circuitry for each specified virtual address indicator.

There are some embodiments, wherein the user-specified instructions comprise a zero-translate task dispatch specification, the zero-translate task dispatch specification comprising: the indication of auxiliary processing circuitry; and further multiple data words defining a further task to be carried out by the auxiliary processing circuitry, wherein the main processing circuitry is responsive to the zero-translate task dispatch specification: to issue a further task dispatch memory write transaction via the interconnect interface, wherein the further task dispatch memory write transaction comprises: the indication of the auxiliary processing circuitry; and the multiple data words. Thus the present techniques further support some task dispatch specifications (for example defined by user-specified instructions) which do not require virtual-to-physical address translation, yet may benefit from all other aspects of the techniques provided.

The task dispatch specification may be presented by the user-specified instructions in a variety of ways. There are some embodiments, wherein the user-specified instructions comprise a task dispatch instruction which specifies the task dispatch specification, and wherein the main processing circuitry is responsive to the task dispatch instruction to perform the virtual-to-physical address translation and to issue the task dispatch memory write transaction via the interconnect interface.

Additionally, or alternatively, in some embodiments the user-specified instructions comprise a task translation instruction and a task write instruction which together specify the task dispatch specification, and wherein the main processing circuitry is responsive to the task translation instruction to perform the virtual-to-physical address translation and is responsive to the task write instruction to issue the task dispatch memory write transaction via the interconnect interface.

In general terms two approaches are disclosed, on the one hand an "all-in-one" approach in which a single instruction is used to submit work to the auxiliary processing circuitry, and on the other hand a "step-by-step" approach in which two types of instruction are used to submit work to the auxiliary processing circuitry: firstly an instruction which causes the virtual-to-physical address translation to be performed and secondly an instruction which causes the task dispatch memory transaction via the interconnect interface.

There are some embodiments, wherein the user-specified instructions comprise multiple task translation instructions and the task write instruction. Thus a sequence of task translation instructions may be followed by the task write instruction, such that a number of virtual-to-physical address translation operations are carried out with respect to separate virtual-to-physical address translation specifications, before these are issued in a bundled transaction or a set or transactions by the subsequent task write instruction.

The virtual-to-physical address translation may be carried out in a variety of ways but there are some embodiments, wherein when performing the virtual-to-physical address translation the main processing circuitry is arranged to store the at least one physical address indicator in a register. There are some embodiments, wherein when performing the virtual-to-physical address translation the main processing circuitry is arranged to store the at least one physical address indicator in a task dispatch buffer. In such a case it may be provided that the translation instruction (or a different instruction) is able to store a word to the task dispatch buffer without virtual-to-physical address translation. This then means that the write transaction can be simplified to only perform the write to the auxiliary processing circuitry without collecting any task dispatch data words which are not translated.

According to the present techniques the virtual-to-physical address translation is handled by the main processing circuitry and is only initiated by one or more user-specified instructions (such as the above-mentioned task translation instruction) and thus a separation of control over the translation process, and in particular prevention of its abuse in the user-specified instructions may be readily enforced. For example there are some embodiments, wherein the main processing circuitry is arranged to perform the data processing operations in response to the user-specified instructions in a user mode, and wherein the main processing circuitry is responsive to the task translation instruction to exit the user mode and enter a restricted mode, wherein the virtual-to-physical address translation is performed in the restricted mode and cannot be performed in the user mode. Thus in such embodiments the apparatus is configured to allow the virtual-to-physical address translation only to be performed in the restricted mode and to prevent it from being carried out in the user mode.

There are some embodiments, wherein when the main processing circuitry is in the restricted mode at least one register into which the at least one physical address indicator resulting from the virtual-to-physical address translation is written cannot be read by instructions other than the task write instruction. This provides a further security mechanism, i.e. that the apparatus is configured (by virtue of being in the restricted mode) to allow only the task write instruction to read the register and to prevent other instructions from reading its content.

There are some embodiments, wherein the main processing circuitry is responsive to exiting the restricted mode to erase content of the at least one register into which the at least one physical address indicator resulting from the virtual-to-physical address translation is written.

There are some embodiments, wherein the main processing circuitry is responsive to: any instruction other than the task translation instruction or the task write instruction; and/or a predefined maximum number of instructions having been executed in the restricted mode, to exit the restricted mode. Thus in some examples any instruction other than these specifically task dispatch related instructions causes the main processing circuitry to exit the restricted mode, where this inconsequence means that access to virtual-to-physical address translation information cannot be accessed by user mode processes. Equally in some examples once a predefined number of instructions has been executed in the restricted mode the main processing circuitry will automatically exit the restricted mode and return to the user mode, regardless of the nature of the further instructions. This mitigates against malicious program code from using this mechanisms for denial of service attacks.

There are some embodiments, wherein the main processing circuitry is responsive to entering the restricted mode to store a processing state checkpoint, and wherein the main processing circuitry is responsive to occurrence of a translation fault or an exception in the restricted mode to cause a processing restart from the processing state checkpoint. Thus the start of the task dispatch specification processing (and the entry into the restricted mode) is check-pointed and a translation fault or other exception causes a restart from that point on return from the exception. Nevertheless in some embodiments exceptions can be deferred until the end of the special processing mode to provide a forward progress guarantee.

The present techniques further recognise that generally it is important that for a program thread executing on the main processing circuitry any memory transactions executed should appear to happen in instruction order to the thread executing them. In this context, one way to incorporate tasks delegated to auxiliary processing circuitry into this is for the delegated tasks to be included in the main processing circuitry execution thread order at the point of the task submission. For generic auxiliary processing circuitry the main processing circuitry is not aware of the exact operation of the auxiliary processing circuitry and does not know the exact memory addresses accessed by the auxiliary processing circuitry. However, in the context of the present techniques disclosed herein, the auxiliary processing circuitry is only allowed to access memory addresses in the pages pointed to by valid physical address indicators (e.g. pointers) in the task dispatch specification and the main processing circuitry can use this information to stall other transactions to these pages. The main processing circuitry may also need to stall the transaction that initiates the delegated task until transactions to the pages used by the auxiliary processing circuitry are complete. Accordingly, there are some embodiments wherein the main processing circuitry is further responsive to the task dispatch specification: to stall access to memory locations corresponding to the at least one physical address indicator by other subsequent processes until a task completion notification corresponding to the task dispatch memory write transaction has been received from the auxiliary processing circuitry; and/or to stall issuance of the task dispatch memory write transaction via the interconnect interface until access to memory locations corresponding to the at least one physical address indicator by other processes has completed. It may often be the case that auxiliary processing circuitry only performs read transactions for some memory regions. For these regions read transactions do not need to be ordered, and for auxiliary processing circuitry read-only regions stall conditions only apply to main processing circuitry writes.

Nevertheless it is further recognised here that a possible limitation of this approach is that unnecessary performance issues may be caused by stalling instructions that access memory locations in pages used for auxiliary processing circuitry work, but at locations which are not used for auxiliary processing circuitry work. It may also prevent the issuance of multiple delegated tasks which seek to use the same page. However, by tracking the size of each memory region accessed by the auxiliary processing circuitry for a given pointer the enforcement of the ordering can work in a more fine-grained manner and avoid unnecessary stalling. Thus there are some embodiments wherein the at least one virtual address indicator is at least one virtual address pointer and the task dispatch specification comprises a specification of a size of at least one memory region referenced by the at least one virtual address pointer, and wherein the main processing circuitry is further responsive to the task dispatch specification to limit definitions of the memory locations corresponding to the at least one virtual address indicator in dependence on the size of the at least one memory region referenced.

Another proposed approach is to consider the delegated work to be a separate thread of execution and to require the use of barrier instructions to synchronize the main processing circuitry execution thread with the accelerator task completion. This requires software to explicitly manage the ordering of CPU execution with accelerator submission and task completion, however can allow for greater parallelization and throughput. Thus there are some embodiments wherein the main processing circuitry is responsive to a barrier instruction following the task dispatch specification in the user-specified instructions to stall execution of further instructions until a task completion notification corresponding to the task dispatch memory write transaction has been received from the auxiliary processing circuitry.

A further proposed extension of the use of such barrier instruction, which can help avoid stalling, is to support multiple barrier groups. Each delegated task is assigned a barrier group on submission. The barrier group is specified in the task dispatch specification, for example an instruction may specify this as an immediate or in register. Barrier instructions can then wait for all tasks, for a subset of barrier groups, or a single barrier group. Thus there are some embodiments wherein the task dispatch specification further comprises an indication for each at least one physical address indicator to be derived for the task dispatch memory write transaction of whether or not that physical address indicator is to be included in a memory transaction ordering control performed by the main processing circuitry. This may be of use to support the efficient submission and synchronization of different types of tasks that have different latencies for completing or operate on different sized data blocks.

A further approach is to combine the two barrier-related approaches mentioned above and to specify in the task dispatch specification how a task is to be synchronized. In embodiments in which adopt the above-mentioned "all-in-one" approach, the job submission instruction may also include information for each valid physical address pointer specifying whether it should be included in the main processing circuitry execution thread memory transaction order, and optionally whether the page will be written to by the delegated task. For the above-mentioned "step-by-step" approach, the task translation instruction may also specify information on whether the pointer should be included in the main processing circuitry execution thread memory transaction order, and optionally whether the page will be written to by the delegated task. Hence, the identification of valid physical address identifiers in the job submission may be extended to also specify whether accesses by the auxiliary processing circuitry to the page referenced should be included in the main processing circuitry execution thread memory transaction order. This information is only used by the main processing circuitry though and does not need to be transferred to the auxiliary processing circuitry.

Synchronization may also be required on a system-wide basis. For example, modification of virtual memory mappings requires system wide synchronization. This includes completion of all delegated tasks affected by the change in virtual memory mappings. In other words, the response to a received distributed virtual memory (DVM) synchronization message applicable to a given delegated task needs to be delayed until accelerator tasks submitted earlier complete. Such a delay of a DVM response to applicable DVM synchronization messages applies from the start of the virtual-to-physical translation for the delegated task, e.g. from the first TLB lookup for the first translation used by an accelerator task. However it is also noted that where a delegated task will only access memory pages indicated in the task submission, it is also possible to track memory pages in use and only stall responses to DVM messages that involve memory pages actually in use for the delegated task. Thus there are embodiments wherein the main processing circuitry is responsive to a distributed virtual memory synchronization message received via the interconnect interface to delay issuing a response to the distributed virtual memory synchronization message until a task completion notification corresponding to the task dispatch memory write transaction has been received from the auxiliary processing circuitry.

In accordance with one example configuration there is provided a method comprising: performing data processing operations in main processing circuitry in response to user-specified instructions, wherein the user-specified instructions comprise a task dispatch specification, the task dispatch specification comprising:

an indication of auxiliary processing circuitry, wherein the auxiliary processing circuitry is external to the main processing circuitry and is connected to the processing circuitry via an interconnect; and multiple data words defining a task to be carried out by the auxiliary processing circuitry, wherein the multiple data words comprise at least one virtual address indicator;

and in response to the task dispatch specification:

performing virtual-to-physical address translation with respect to the at least one virtual address indicator to derive at least one physical address indicator; and issuing a task dispatch memory write transaction via the interconnect, wherein the task dispatch memory write transaction comprises:

the indication of the auxiliary processing circuitry; and the multiple data words, wherein the at least one virtual address indicator in the multiple data words is substituted by the at least one physical address indicator.

In accordance with one example configuration there is provided an interconnect for connecting main processing circuitry to auxiliary processing circuitry, wherein the interconnect is arranged to convey to the auxiliary processing circuitry a task dispatch memory write transaction issued by the main processing circuitry, wherein the task dispatch memory write transaction comprises:

an indication of the auxiliary processing circuitry; and multiple data words defining a task to be carried out by the auxiliary processing circuitry, wherein the multiple data words comprise at least one physical address indicator, wherein the interconnect is responsive to the task dispatch memory write transaction, when the at least one physical address indicator is comprised in write data to be written to a target location which is read-accessible, to reject the task dispatch memory write transaction.

Physical address data can thus be protected by the provision of an interconnect which has the above configuration. Specifically, in order to prevent physical address data from being read, this configuration supports the provision of a system in which the writing of physical address data is not permitted to destinations where the information could then subsequently be read back. Hence, the interconnect can support this by checking the destination for task dispatch memory write transactions and by rejecting such transactions for destinations where such read access would be possible. Alternatively the interconnect may be arranged to only allow task dispatch writes to locations that specifically can accept such transactions. Where in typical scenarios this will only be a small set of locations, this approach may be preferred for simplicity of implementation Generally the provision of the present techniques to allow a low overhead mechanism by which data processing tasks may be delegated (e.g. by which a CPU can submit jobs to an accelerator) may find useful application is a variety of scenarios. To name just a few:

- To support frame buffer compression. Implementing image processing on a CPU can become less bandwidth intensive if there is a low-overhead accelerator for compressing/decompressing frame buffer data. For example, the accelerator work package could consist of two pointers (to compressed page and uncompressed buffer), the page block index, the operation to perform (compression or decompression) and the compression descriptor.
- To accelerate memcopy. The C stdlib memcopy function is very commonly used and would be simple to accelerate in an accelerator. A accelerator can typically issue many more memory transactions in parallel than a CPU core, and easily handle the special cases around alignment and direction of copy for overlapping buffers. Using an accelerator for this rather than directly supporting memcopy in the instruction set enables sharing of the resource between multiple CPU cores.
- Neural network weight and activation data compression. This may for example be introduced into a model-based predictive control approach as new data types and codecs. This provides a straightforward way to support compression of neural network data for CPU neural network processing and can be a powerful way to enable compression for an accelerator.
- High performance crypto acceleration. Specialized crypto acceleration instructions (dedicated to performing particular crypto-related functions) may be somewhat limited in performance when there are encrypted file systems or very high bandwidth network connections. The availability of a supporting accelerator to which tasks can be easily delegated can relatively simply achieve significantly higher throughput.
- Streaming data compression. Examples such as high throughput data compression and decompression with larger block sizes, such as zram/zswap, compressed file systems and so on provide interesting use cases. These could be accelerated with an accelerator and enable significant improvements in system cost/performance (e.g. high performance compressed file system and RAM can allow a reduction in the RAM and storage in a system with little impact on the user experience).

Particular embodiments will now be described with reference to the figures.

FIG. 1 schematically illustrates a data processing system 100 in accordance with some embodiments. The system 100 comprises a CPU cluster 101, which itself comprises a first CPU core 102, a second CPU core 103, an accelerator 104, and a shared cache 105. The system 100 further comprises a GPU 106, which itself comprises an accelerator 107. The CPU cluster 101 and the GPU 106 are connected by means of an interconnect 108, via which they each also have access to memory 109. This data processing system thus presents an example in which the present techniques may be embodied, wherein each accelerator instance 104, 107 represents auxiliary processing circuitry to which the CPU cores 102, 103, as examples of main processing circuitry, may delegate data processing tasks. Indeed the GPU 106 may also be considered to represent auxiliary processing circuitry to which the CPU cores 102, 103 may delegate data processing tasks. Nevertheless it should be appreciated that the configuration shown is only by way of example and the present techniques may be implemented in any system which comprises main processing circuitry (such as a CPU) and auxiliary processing circuitry (such as an accelerator).

Figure 2:
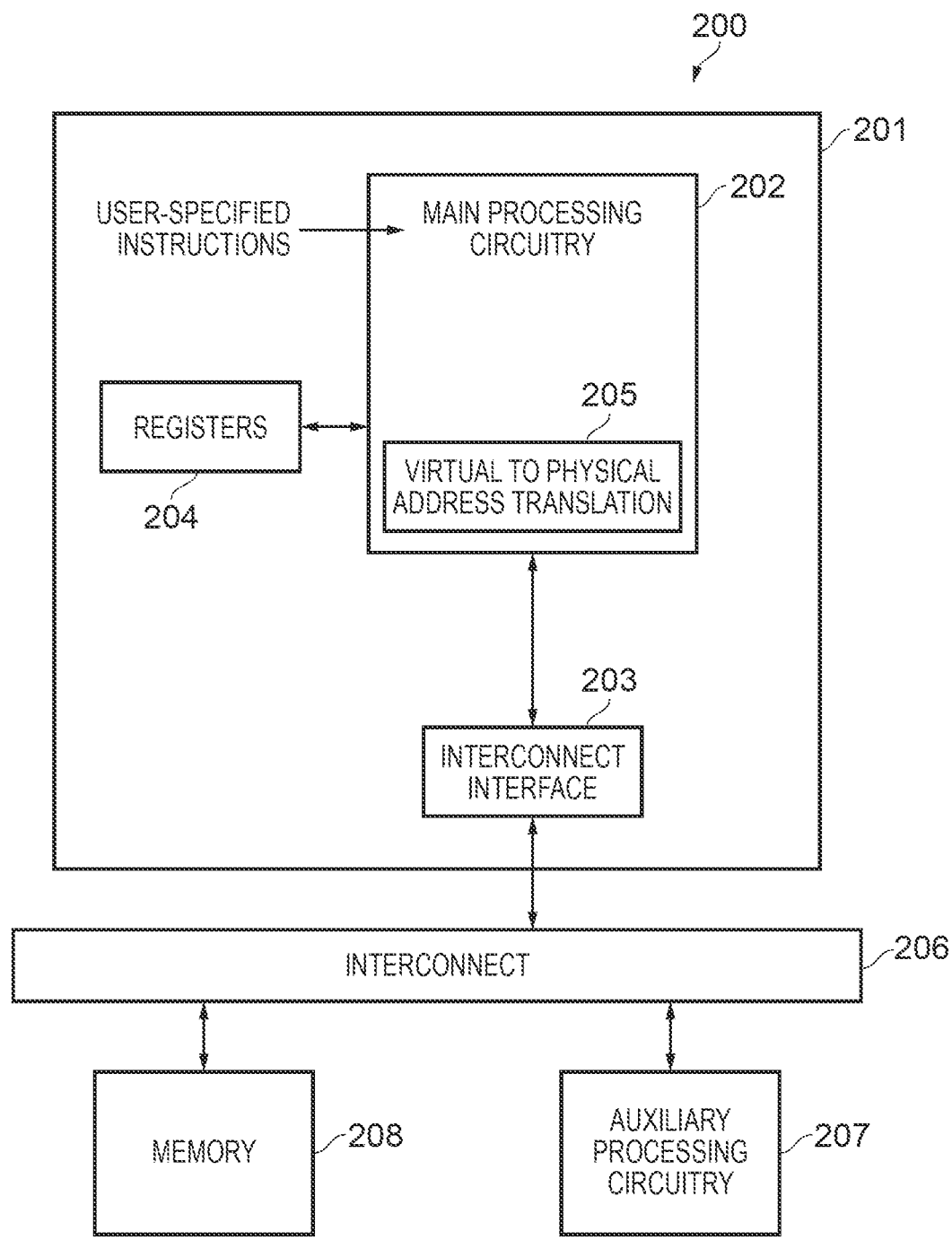
FIG. 2 schematically illustrates an example data processing system.

FIG. 2 schematically illustrates a data processing system 200 in accordance with some embodiments, which comprises an apparatus 201. The apparatus 201 comprises main processing circuitry 202, which is arranged to perform data processing operations defined by a sequence of user-specified instructions. Generally the main processing circuitry 202 performs the data processing operations on data values, which are held in registers 204 and with access to data stored in the memory 208. Data values at specified memory locations can be retrieved from the memory 208, can be subjected to data processing operations whilst held in the registers 204, and modified data values can be written back to specified memory locations in the memory 208. One of ordinary skill in the art is very familiar with this general operation of a data processing apparatus and further detail of conventional aspects are dispensed with here for the sake of brevity and clarity. The main processing circuitry 202 accesses other components of the system via its interconnect interface 203 and the interconnect 206. Of particular relevance to the present disclosure is the provision in the system 200 of the auxiliary processing circuitry 207, to which the main processing circuitry 202 can delegate certain data processing tasks. Moreover, this delegation of processing tasks can be initiated by the user-specified instructions, whereby the instructions define a task dispatch specification, which indicates the auxiliary processing circuitry that is to carry out the delegated task (auxiliary processing circuitry 207 in the example of FIG. 2) and further specifies multiple data words defining the task to be carried out. One feature of particular note here is that the multiple data words comprise at least one virtual address indicator, for example a virtual address pointer, which indicates target data to be acted on by the delegated task. Note therefore that a user space process (i.e. one being carried out in a "normal" data processing mode of the apparatus, without enhanced security privileges) can make use of this task delegation mechanism, specifying the task in terms of the memory view which has been allocated to that process. In handling the task dispatch specification the main processing circuitry 202 performs virtual-to-physical address translation on the (at least one) virtual address pointer, making use of its virtual-to-physical address translation circuitry 205. In doing so the main processing circuitry 202 derives at least one physical address indicator (e.g. a physical address pointer) corresponding to the physical address location of data to be subjected to the delegated task. Further, the main processing circuitry 202 then issues a task dispatch memory write transaction via the interconnect interface 203, targeting the auxiliary processing circuitry 207, where the task dispatch memory write transaction comprises the multiple data words of the task dispatch specification, but where the at least one virtual address pointer is substituted by a corresponding at least one physical address pointer. An indication of the auxiliary processing circuitry in the transaction allows the interconnect 206 to direct it to the auxiliary processing circuitry 207. The system 200 further comprises memory 208 to which both the apparatus 201 and the auxiliary processing circuitry 207 have access via the interconnect 206.

Figure 3:
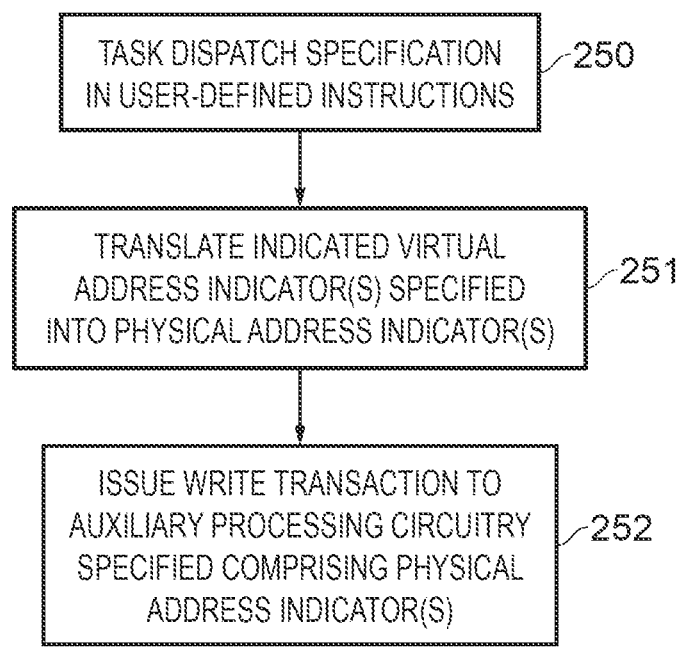
FIG. 3 is a flow diagram showing a sequence of steps which are taken in some examples.

FIG. 3 is a flow diagram showing a sequence of steps which are taken in some example embodiments. These steps represent the key procedural waypoints when an apparatus such as apparatus 201 encounters a task dispatch specification in the user defined instructions it is executing, causing it to delegate a specified data processing task to auxiliary processing circuitry such as auxiliary processing circuitry 207. The flow begins with step 250 when the task dispatch specification is encountered in the user-defined instructions. In response (at step 251) one or more virtual address indicators (e.g. virtual address pointers) specified in the task dispatch specification are translated into one or more physical address indicators (e.g. physical address pointers). Finally at step 252 and the apparatus issues a write transaction (to be conveyed via an interconnect) to the auxiliary processing circuitry indicated in the task dispatch specification, where this write transaction comprises the one or more physical address indicators which were generated at the previous step.

FIGS. 4A, 4B, 5A, and 5B schematically illustrate various examples of task delegation instructions and the consequent preparation of a write transaction. These may be in accordance with either of the above-mentioned two approaches, namely the "all-in-one" approach or the "step-by-step" approach. For the all-in-one approach the instructions shown in each of FIGS. 4A, 4B, 5A, and 5B will cause not only the required virtual-to-physical address translation to be carried out but also the preparation and transmission of the write transaction to the target auxiliary processing circuitry. For the "step-by-step" approach, the instructions shown in each of FIGS. 4A, 4B, 5A, and 5B is only a translation instruction ("TRANS") which will cause only the required virtual-to-physical address translation to be carried out, and the subsequent preparation and transmission of the write transaction to the target auxiliary processing circuitry will be performed in response to a separate instruction ("WRITE"). Generically the instructions shown in each of FIGS. 4A, 4B, 5A, and 5B are referred to in the following as a "task delegation instruction".

Figure 4A:
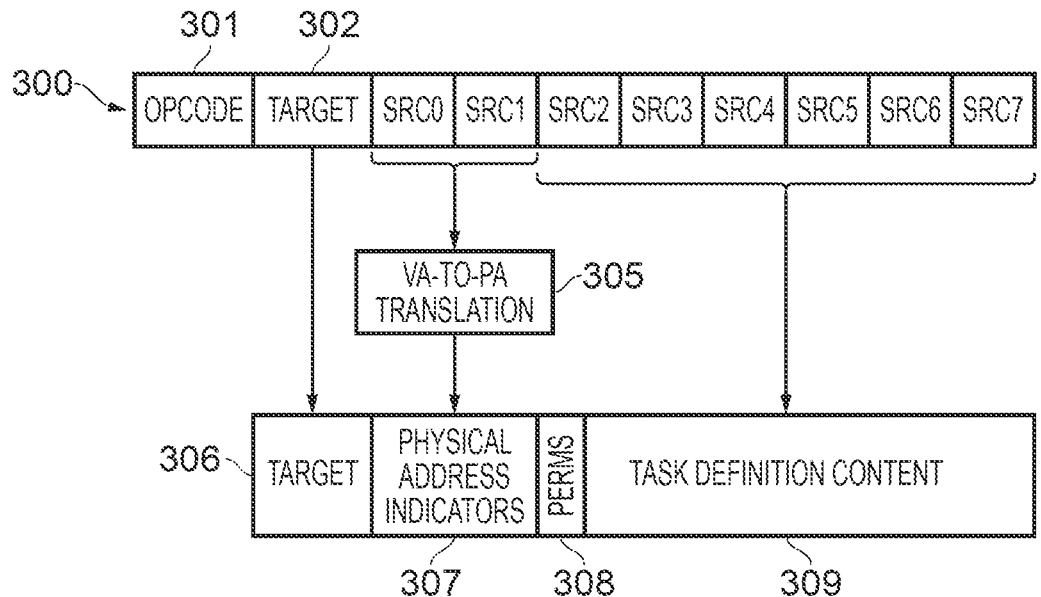
FIGS. 4A, 4B, 5A, and 5B schematically illustrate various examples of task delegation instructions and the consequent preparation of a write transaction.

In FIG. 4A the task delegation instruction 300 is schematically shown to comprise an opcode 301, which defines the instruction (amongst many others in the relevant processor architecture) to be a task delegation instruction. Indeed a number of different task delegation instructions may be defined, such that information within the opcode field 301 may be used, for example, to configure the particular type of task delegation and/or aspects of how the instruction is executed. The task delegation instruction 300 specifies the target of the task delegation, i.e. this is an indication of the auxiliary processing circuitry which will perform the delegated task. This indication may take various forms. The indication of the auxiliary processing circuitry may be a value taken from an enumerated and predefined set of possibilities. In other examples the target is specified in terms of a memory address, this being a selected memory address which is defined in the system memory mappings to correspond to the auxiliary processing circuitry. By this mechanism a write transaction which targets the specified memory address can be conveyed by the usual interconnect mechanisms to the auxiliary processing circuitry, together with the further multiple data words forming the write transaction, even though these multiple data words will not actually be written to that specified memory address in the usual sense of a memory write. In the example of FIG. 4A the remainder of the task delegation instruction 300 comprises indications of a set of source registers (in the illustrated example of a set of eight source registers). As shown in the figure, the first two of these (SRC0 and SRC1) are subjected to virtual-to-physical address translation by virtual-to-physical address translation circuitry 305 to generate a set of physical address indicators (e.g. pointers) 307. Permission data 308 corresponding to each is also conveyed. Together with the target information 306, which may have been converted in format, e.g. from an enumerated value (indicating a choice of auxiliary processing circuitry) to a memory address (reserved in the system memory mapping to indicate delegated task reception by that selected auxiliary processing circuitry), and task definition content 309, these items form the content of a write transaction constructed by the main processing circuitry to be conveyed to the auxiliary processing circuitry via an interconnect. As noted above, the construction and transmission of this write transaction may automatically follow the virtual-to-physical address in the case of an "all-in-one" instruction or may subsequently be triggered by a second instruction for that purpose in the case of the "step-by-step" approach.

Figure 4B:
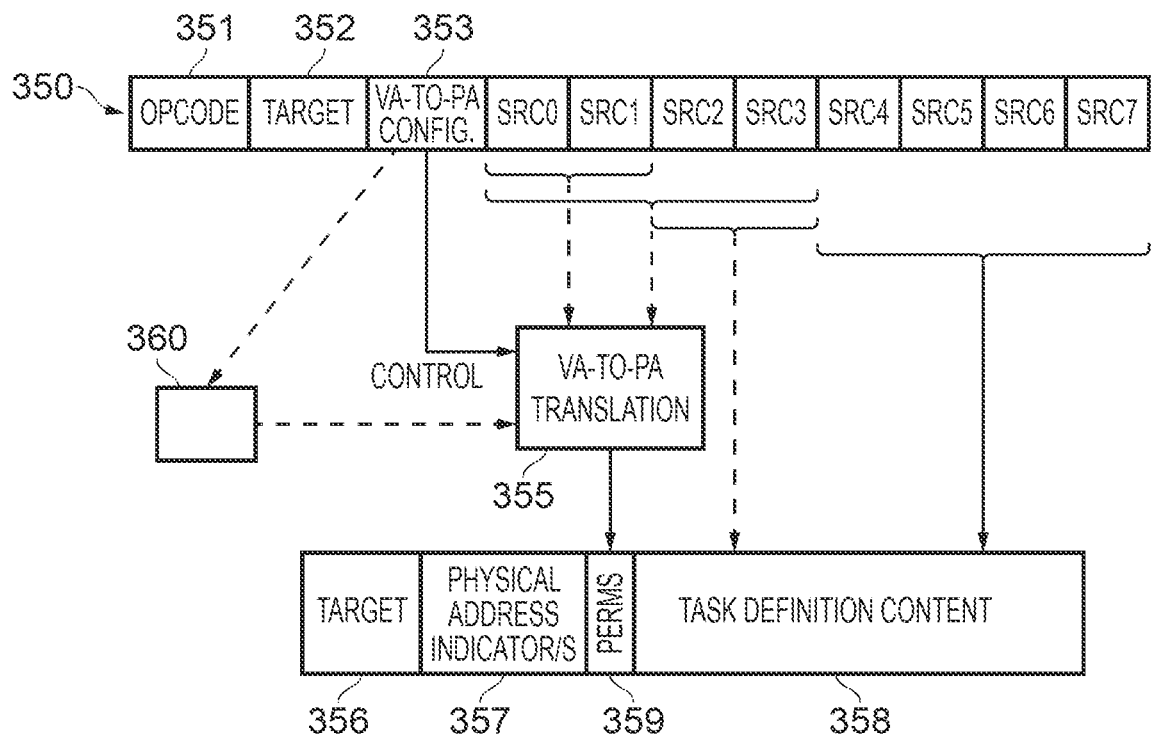

FIG. 4B schematically illustrates another example of task delegation instruction. The task delegation instruction 350 is schematically shown to comprise an opcode 351 and a target 352, as in the example of FIG. 4A. The task delegation instruction 350 additionally comprises information 353 which configures the virtual-to-physical address translation. As in the case of the task delegation instruction 300, the remainder of the task delegation instruction 350 comprises indications of a set of source registers (SRC0 to SRC7). In the illustration of FIG. 4B the configuration information 353 is shown to form a control input to the virtual-to-physical address translation circuitry 345 and to control which of the indicated source registers (SRC0 to SRC7) is to be subjected to the virtual-to-physical address translation. The two dashed paths providing input to the virtual-to-physical address translation circuitry 355 illustrates a relatively simple choice which may be indicated by the configuration information 353, namely whether only the first two indicated source registers (SRC0, SRC1) are translated, or whether the first four indicated source registers (SRC0-SRC3) are translated. Generally the configuration information 353 may be defined in various ways to indicate the registers which should be subjected to address translation, such as in the form of an immediate value or by providing an indication of a register 360 which itself contains such control information. The control information itself may be specified in various ways such as by means of a bit mask or an enumeration of a set of options. For example an 8-bit value provided as the configuration information 353 may be interpreted as a bit mask indicating which of the set of source registers (SRC0-SRC7) should be subjected to address translation. Equally a value may correspond to one of a range of enumerated subsets, e.g. for a 2-bit value an example enumeration could be that: 0rb indicates 2 source registers; 10'b indicates 4 source registers; and 11'b indicates 8 source registers. Indeed as a complementary use of the task delegation instruction 350, a configuration value 353 of 00'b may be used to indicate that no address translation should be performed on any of the source registers, i.e. that in the example of FIG. 4B the unamended content of all 8 should be form part of the task definition content 358 in the write transaction. This would be an example of a "no translation" use of the large write transaction technique disclosed herein, which can also be supported. When in the usual case physical address indicators (e.g. pointers) 357 form part of the write transaction, permission data 359 corresponding to each is also conveyed.

Figure 5A:
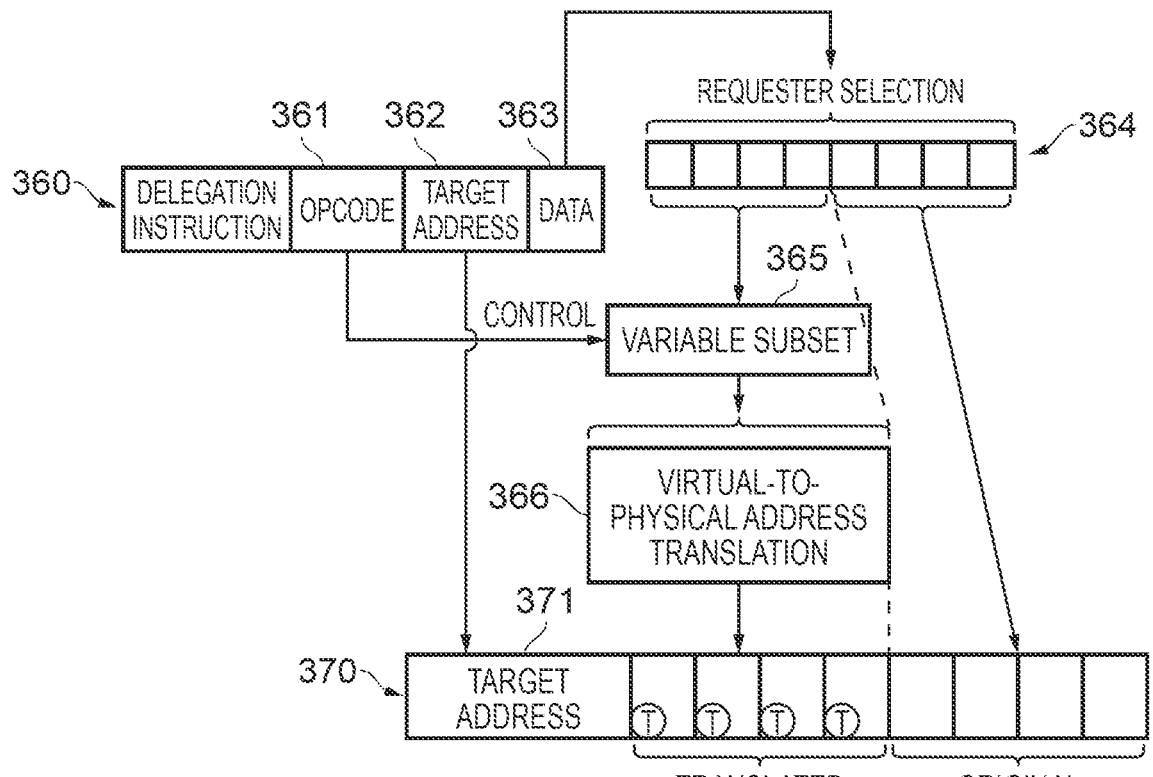

FIG. 5A schematically illustrates a further example of a task delegation instruction 360, comprising opcode 361, target address 360 and further data 363. Here the data 363 are used to indicate a selection of registers 364 which will provide the content of the write transaction generated and a value encoded in the opcode 361 provides control information defining a variable subset 365 taken from the selected registers 364 that is subjected to the virtual-to-physical address translation by the virtual-to-physical address translation circuitry 366. In this example the target address 362 is provided unamended to form the target address 371 of the write transaction 370. Accordingly the write transaction 370 can be seen to comprise the target address 371, a set of translated data items and a set of original (i.e. not translated) data items. Note also that in this example where the subset which undergoes address translation is variable, the write transaction 370 further comprises an indication (shown as 'T') of which data items have been subjected to address translation i.e. comprise physical address information. In other examples, where the subset which undergoes address translation is fixed, this information may be implicit. For example in the write transaction a fixed subset of the conveyed data words may always hold physical address information. The provision of this information as part of the write transaction enables the recipient auxiliary processing circuitry to ensure that memory accesses are only made by it to valid physical addresses. Any valid physical address data is also accompanied by its permission data.

Figure 5B:
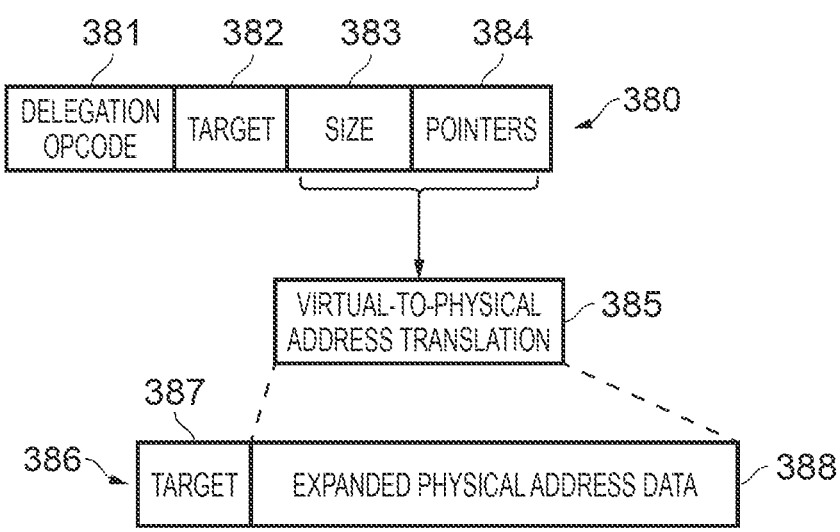

FIG. 5B schematically illustrates a further example of a task delegation instruction 380, comprising opcode 381 and target information 382. The task delegation instruction 380 further comprises size information 383 and pointers 384. The size information 383 is used to specify the size of the memory referenced by each virtual address pointer comprised in the set of pointers 384. This size information 383 can be specified in various ways, as for example described above with reference to FIG. 4B for the subset control information, i.e. it may be an immediate value, a value taken from a register, or alternatively using a bit mask (to select between predefined options) or an enumeration of a set of options (similarly predefined). The size may for example be specified in bytes or a number of blocks, although other representations may also be used. The size information 383 and set of pointers 384 are provided to the virtual-to-physical address translation circuitry 385, which converts these into a set of physical address information. In particular it is arranged such that a virtual address pointer which crosses one or more virtual memory pages is translated into multiple physical address pages, which will all then be communicated as part of the write transaction—see the expanded physical address data 388 forming part of the write transaction 386 (comprising physical address data and its permission data) together with the target address information 387.

The above described examples of task delegation instructions discussed with reference to FIGS. 4A, 4B, 5A, and 5B may be implemented such that each forms a "standalone" command, also referred to herein as a "task dispatch instruction", in response to which the required address translation is performed and generated write transaction is transmitted. Alternatively each may be implemented to provide only the translation functionality (also referred to herein as a "task translation instruction" or "TRANS"), such that the required address translation is performed on the content of at least one register, and a further instruction (also referred to herein as a "task write instruction" or "WRITE") is then also provided in the implementation which can be used to cause the content of a number of registers to be written to the task delegation target in the transaction conveyed by the interconnect. Also the particular features described with respect to each of FIGS. 4A, 4B, 5A, and 5B, such as fixed source register subset address translation or instruction control of some aspect of the address translation, specification of the size of memory region for the task, and the generation of multiple physical address pointers in response to a single virtual address pointer combined with size information, may be freely combined in embodiments and are merely described in separate sub-figures here for clarity of description.

Figure 6:
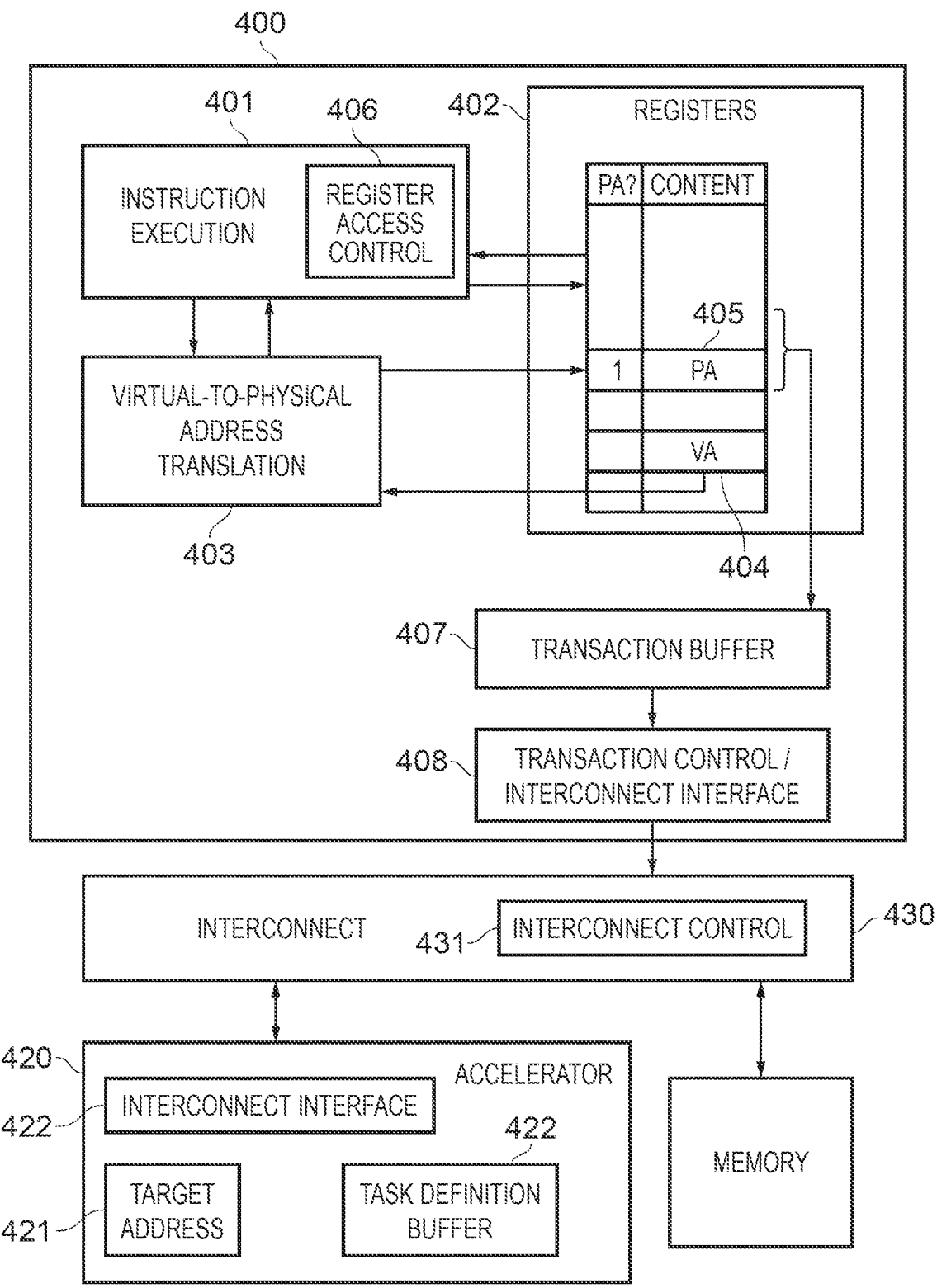
FIG. 6 schematically illustrates some components of an example data processing system.

FIG. 6 schematically illustrates some components of data processing system in accordance with some embodiments. A data processing apparatus 400 comprises instruction execution circuitry 401, which has access to registers 402. The data processing apparatus 400 may perform various data processing operations in response to the user-defined instructions it executes. Further in response to certain instructions disclosed herein, the data processing apparatus 400 can delegate certain data processing tasks to the accelerator 420, which also forms part of the data processing system. The task delegation instructions executed by the instruction execution circuitry 401 may take any of the forms described above or elsewhere herein.

Nevertheless the illustration of the interaction with the registers 402 presents a specific sequence of steps which correspond to the "step-by-step" approach, i.e. where two types of task dispatch related instructions are used, namely the TRANS and the WRITE instructions. In response to a TRANS instruction the apparatus 400 switches to operation in a special, restricted mode to provide protection for the physical address information which will be handled. The instruction execution circuitry accesses the registers 402 and causes the content of a first register 404 to be subjected to virtual-to-physical address translation 403, the result of which is written to a specified second register 405. This destination register 405 is marked (e.g. by a bit in the labelled 'PA' column) to indicate that it contains physical address information. The instruction execution circuitry 401 further comprises register access control 406, which controls the access to the registers 402 and when a register is marked as containing physical address information this limits access to that register, in particular such that it cannot be read by instructions other than the WRITE instruction. When the apparatus 400 exits the restricted mode those registers which are marked as containing physical address information are erased. The execution of a subsequent WRITE instruction, specifying the register 405 containing the physical address information causes the content of this register (and other registers as appropriate) to be copied into the transaction buffer 407, where write transactions such as those schematically illustrated in FIGS. 4A, 4B, 5A, and 5B are temporarily constructed and held before being passed to the interconnect 430 via the transaction control interconnect interface 408. It may also be provided that that the TRANS instruction (or indeed a different instruction) is used to store a word to the task dispatch buffer without any virtual-to-physical address translation. Thus other parts of a desired write transaction to be transmitted to the auxiliary processing circuitry can be accumulated in the transaction buffer 407 and then the write transaction can be simplified to only perform the write to the auxiliary processing circuitry without collecting any task dispatch data words which are not translated.

The interconnect 430 conveys a write transaction to its target. Under the control of the interconnect control 431, generally the interconnect 430 transmits the write transaction in the manner of various types of transactions handled by the interconnect. However some aspects of the handling of the large write transaction disclosed herein are specific to this type of transaction, which carries an indicator so that it may be identified as a task dispatch transaction (i.e. an accelerator job submission/"large write" transaction). As mentioned above in addition to the data which is the subject of the write transaction, the transaction also carries one or more indications showing which data items (e.g. data words)

are valid physical address indicators (e.g. pointers). This may be accomplished in various ways and may vary depending on the particular nature of those data items. As in the example of FIG. 5A discussed above, each indicator may be individually labelled. However a range of encodings are possible and may in particular be employed when a virtual address pointer range crosses (and thus results in indications of) multiple physical address pages, i.e. such that each of them is correctly labelled as comprising physical address information. One possibility here is to transfer the virtual address or in page offset and the physical address page base address and definitions of the memory range of each point translated. Generally the permissions pages pointed to by each valid physical address pointer also form part of the write transaction.

The interconnect control 431 is responsive to any of these kinds of indications of valid physical address information to determine whether the write transaction is targeting a permitted location, i.e. in a destination associated with auxiliary processing circuitry (e.g. an accelerator) which is configured to participate in the present techniques. A transaction comprising such valid physical address information is not allowed to terminate in generic memory or any other kind of peripheral. This prevents non-privileged software from reading back the translated physical address from a generic memory location.

The auxiliary processing circuitry, accelerator 420, is the target of the example large write transaction in the example of FIG. 6 and as such is conceptually illustrated as comprising target address 421. In practice this will typically involve the auxiliary processing circuitry implementing at least one memory page suitable for such mapping as a job submission address accessible to non-privileged processes. A single physical page can be mapped into many non-privileged processes. Nevertheless certain controls (permissions) are applied, in particular because of the shared nature of this physical page to support system cross-process security. For example an attempt to read the page will always return static information, and certainly not any of the write transaction data which uses this destination as its target. For example the accelerator 420 may be configured to return information about the accelerator capabilities, such that other system components may discover this accelerator as part of a setup process. In addition to the security checks performed by the interconnect 430 the accelerator 420 is also configured to ignore any writes to this "job submission page" 421 other than valid task delegation transactions. The accelerator 420 may be variously configured to handle valid tasks it receives, for example definitions of these tasks may be temporarily buffered in task definition buffer 422, such that multiple tasks may be queued for execution. Once the task processing is complete the accelerator 420 responds to the transaction received. All memory transactions relating to the task must be complete at the point when this response is sent.

Figure 7:
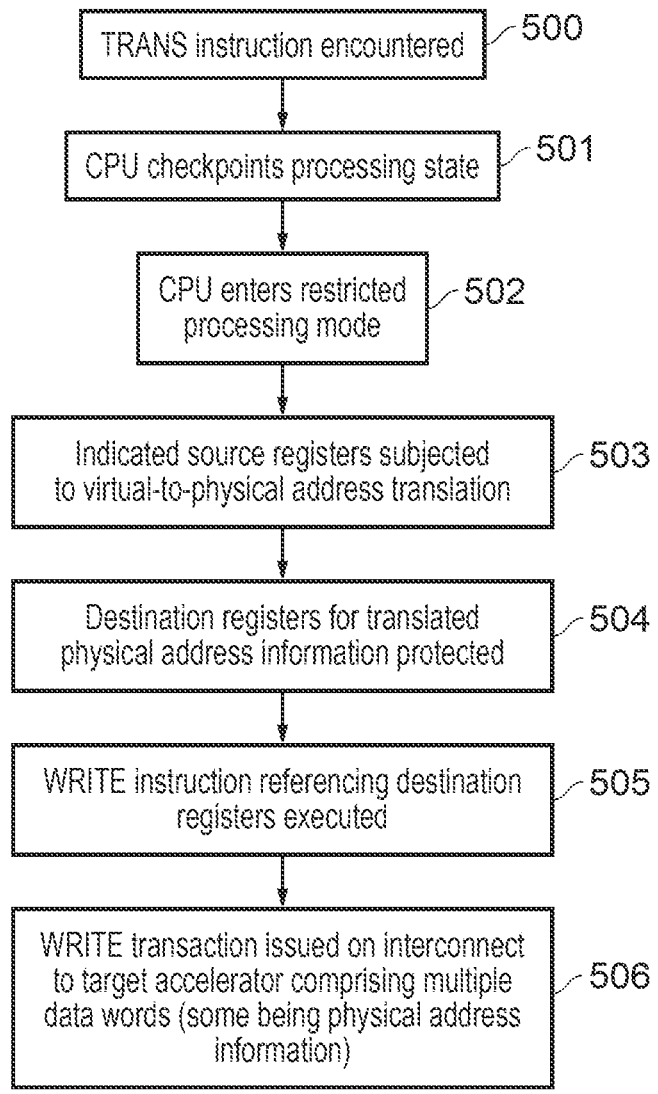
FIG. 7 is a flow diagram showing a sequence of steps, which illustrate the general outline of some examples when a "step-by-step" approach is taken in where two types of task related instructions are implemented.

FIG. 7 is a flow diagram showing a sequence of steps, which illustrate the general outline of some examples when the "step-by-step" approach is taken, i.e. where two types of task related instructions are implemented: one to trigger required virtual-to-physical address translation and one to trigger the "large write" targeting the auxiliary processing circuitry which will carry out the delegated task. The illustrated flow begins at step 500 where a TRANS instruction is encountered by the main processing circuitry. Then at step 501 the CPU checkpoints its processing state. Next at step 502 the CPU enters a restricted processing mode (from the user mode it has previously been in when executing generic instructions). At step 503 source registers indicated as requiring virtual-to-physical address translation by the TRANS instruction are subjected to that virtual-to-physical address translation. At step 504 the destination registers into which any translated results, i.e. comprising valid physical address information, have been written are protected, such that this information is not generally available to user processes. This may for example be achieved by the above-mentioned technique of labelling particular registers as holding physical address information. Next at step 505 a write instruction is executed which references (possibly amongst other registers) the destination registers into which physical address information was written, causing a corresponding write transaction to be generated and at step 506 this write transaction is issued on the interconnect to the target accelerator comprising multiple data words some of which (labelled as such) comprise physical address information.

Figure 8:
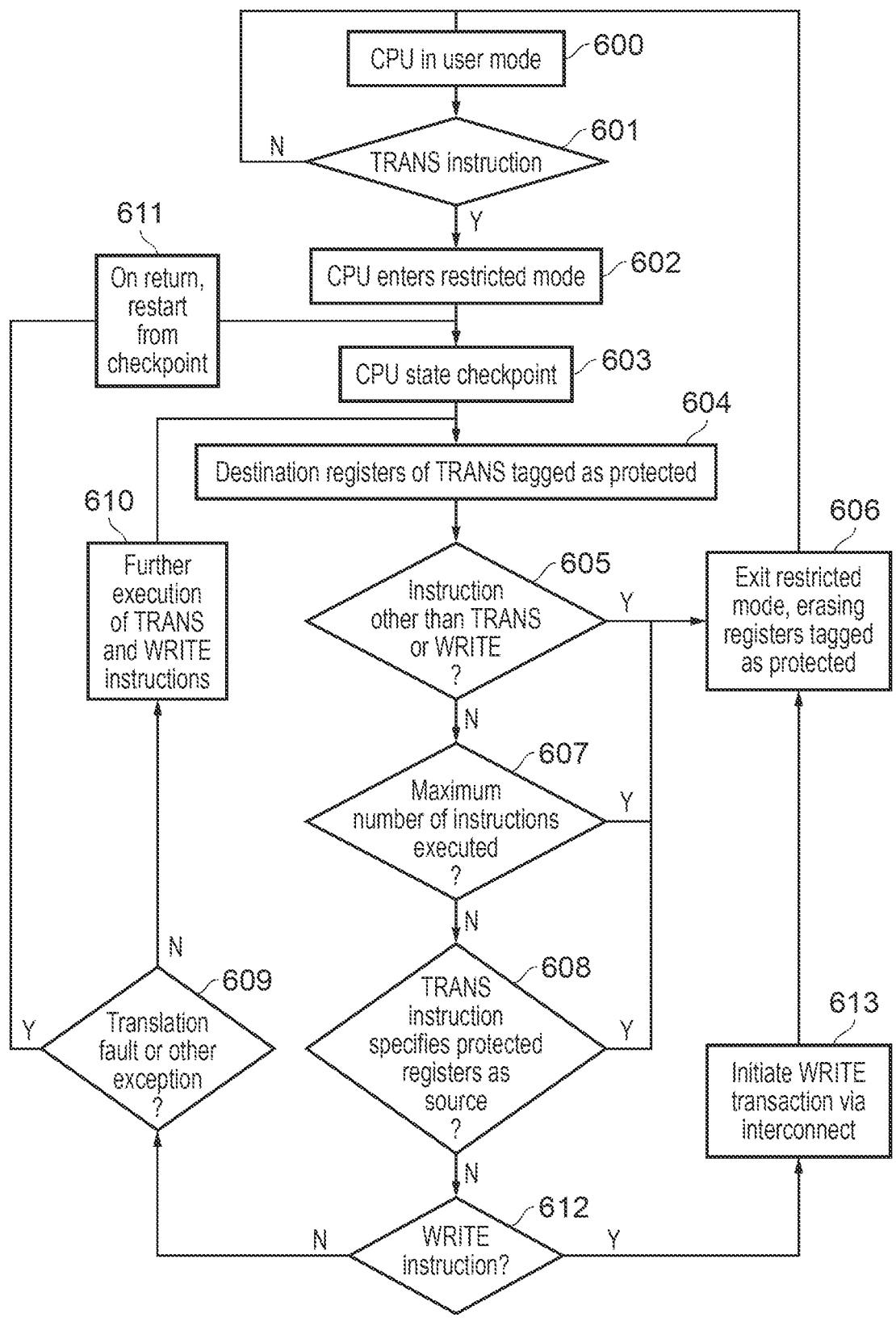
FIG. 8 is a flow diagram showing a sequence of steps which are taken according to some examples, in which a CPU transitions between a user mode and a restricted mode.

FIG. 8 is a flow diagram showing a sequence of steps which may be taken according to some examples, in which a CPU transitions between a user mode and a restricted mode in the process of handling TRANS and WRITE instructions. The flow may be considered to begin at step 600, where the CPU is operating in a user mode, i.e. is executing a sequence of user-defined instructions at a non-privileged security level. Whilst a TRANS instructions not encountered in the sequence of instructions (checked at step 601) the flow returns to step 600 and the CPU continues operating in the user mode. However when a TRANS instruction is encountered the flow proceeds to step 602 and the CPU enters a restricted mode (at a more privileged security level). At this point the CPU state is check-pointed (step 603), and the execution of the TRANS instruction, causing virtual-to-physical address translation to be performed and for the result to be stored in one or more destination registers, also causes (step 604) those destination registers to be tagged for protection (on the basis that they now hold security-sensitive physical address information). The restricted mode, operating at the more privileged security level, may also cause a number of security-related checks to be performed on an ongoing basis. In the example procedural flow of FIG. 8, the first of these is shown at step 605, at which it is determined whether an instruction other than TRANS or WRITE is encountered. When this is the case the flow proceeds to step 606 and the CPU exits the restricted mode, erasing content of any registers tagged as protected (i.e. deleting the physical address information stored therein). The flow then returns to 600 for the CPU to continue operation in the user mode. Equally at step 607 it is determined if a maximum predefined number of instructions has now been executed in the restricted mode (the CPU may maintain a counter for this purpose). When this is the case the flow proceeds to step 606 (as described above). Further, a check at step 608 determines if a TRANS instruction encountered specifies one of the protected registers (i.e. holding physical address information) as its source register. If this occurs then the flow proceeds to step 606 (as described above). When none of these conditions (at steps 605, 607, and 608) to exit the restricted mode are met, the CPU initially remains in the restricted mode. At step 612 it is determined if a WRITE instruction has now been encountered. When this is the case the flow proceeds to step 613 and the corresponding write transaction is initiated to be conveyed via the interconnect. Then the flow returns to step 606, where the CPU exits the restricted mode, erasing content of any registers tagged as protected (i.e. deleting the physical address information stored therein). If a WRITE instruction has not been encountered, then from step 612 the flow proceeds to step 609, where it is determined whether a translation fault or other exception has occurred. In the absence of such an exception further execution of TRANS and WRITE instructions in the restricted mode may continue (step 610), with the flow returning to step 604 (such that the example ongoing checks on "safe behaviour continue). If however such an exception does occur then the flow passes via step 611 and on return from the exception a restart from the check-pointed state (when the CPU exited the user mode and entered the restricted mode) is triggered. From this checkpoint (step 603) the processing of the TRANS and WRITE instructions can be restarted. As an alternative, the system may be configured such that not all exceptions would cause such a restart and instead some exceptions can be deferred until the end of the special processing restricted mode, in order to support forward progress.

Figure 9:
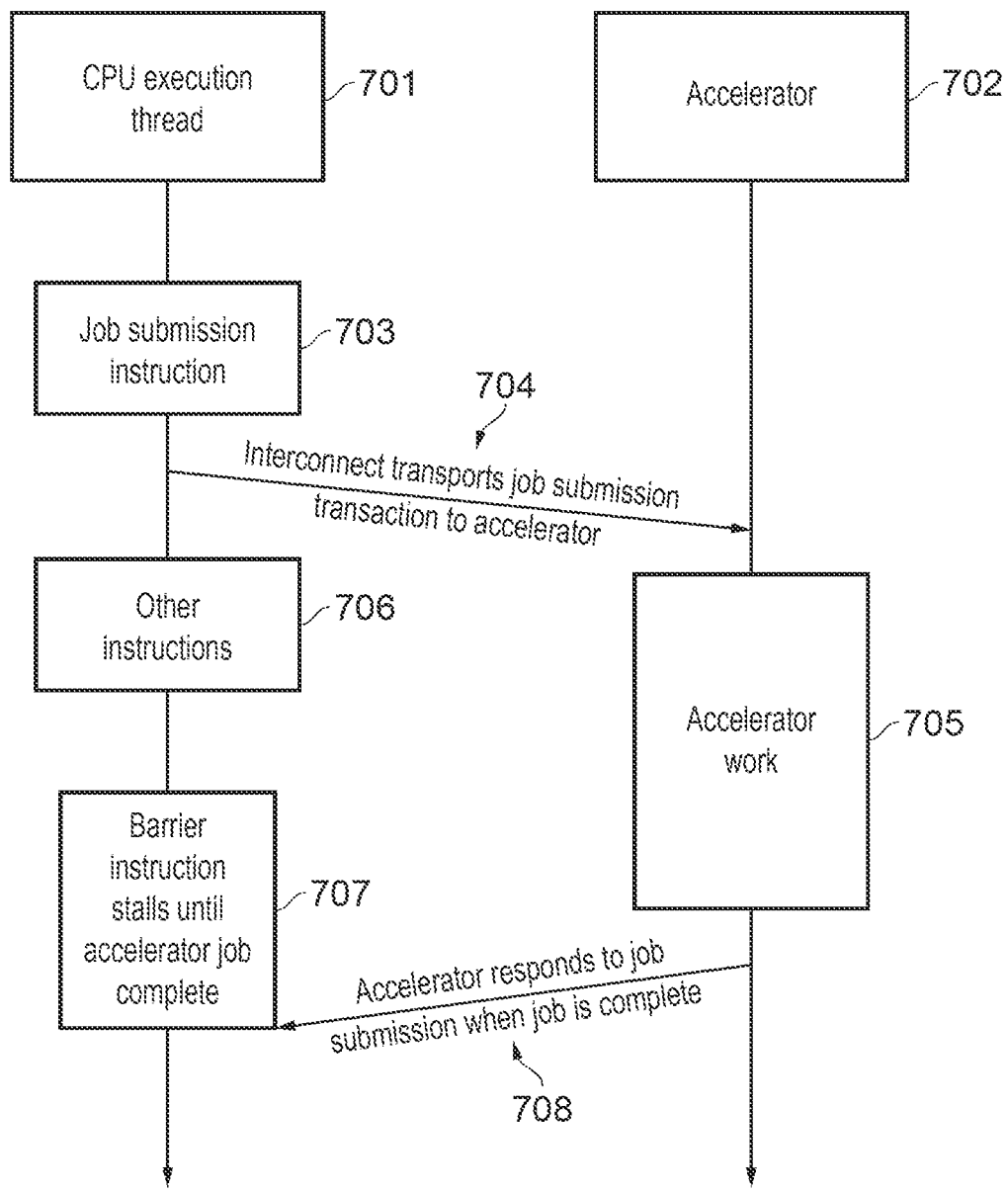
FIG. 9 schematically illustrates example interplay between a CPU execution thread and the operation of an accelerator.

FIG. 9 schematically illustrates the interplay between a CPU execution thread 701 and the operation of an accelerator 702 in a data processing system in some examples. In the CPU execution thread 701 a single job submission instruction (i.e. the "all-in-one" instruction described above) is encountered and as a result the interconnect transports (704) a job submission transaction to the accelerator, causing the accelerator to perform (705) the specified accelerator work (delegated task). In the interim the CPU execution thread 701 continues with the execution of other instructions (706), but then (707) reaches a barrier instruction, requiring further instruction execution to stall until the accelerator job completes. Once the accelerator responds to the job submission transaction (once the accelerator work is complete), the stall is released and further instruction execution in the CPU execution thread can continue. Other operations by the accelerator may also continue. The use of a barrier instruction related to the delegation of data processing to the accelerator supports the requirement that in a CPU execution thread memory transactions executed should appear to happen in instruction order to that CPU execution thread. Thus one way to incorporate accelerator work into this requirement is to include the accelerator work in the CPU execution thread order at the point of the accelerator work submission. It should be noted that for a generic accelerator the CPU is not aware of the exact operation of the accelerator and does not know the exact memory addresses accessed by the accelerator. However according to the present techniques the accelerator is only allowed to access memory addresses in pages pointed to by valid physical address pointers in the job submission data and the CPU can use this to store transactions to these pages the CPU also needs to store the transaction initiates the accelerator job until transactions to the pages used by the accelerator are complete.

Figure 10:
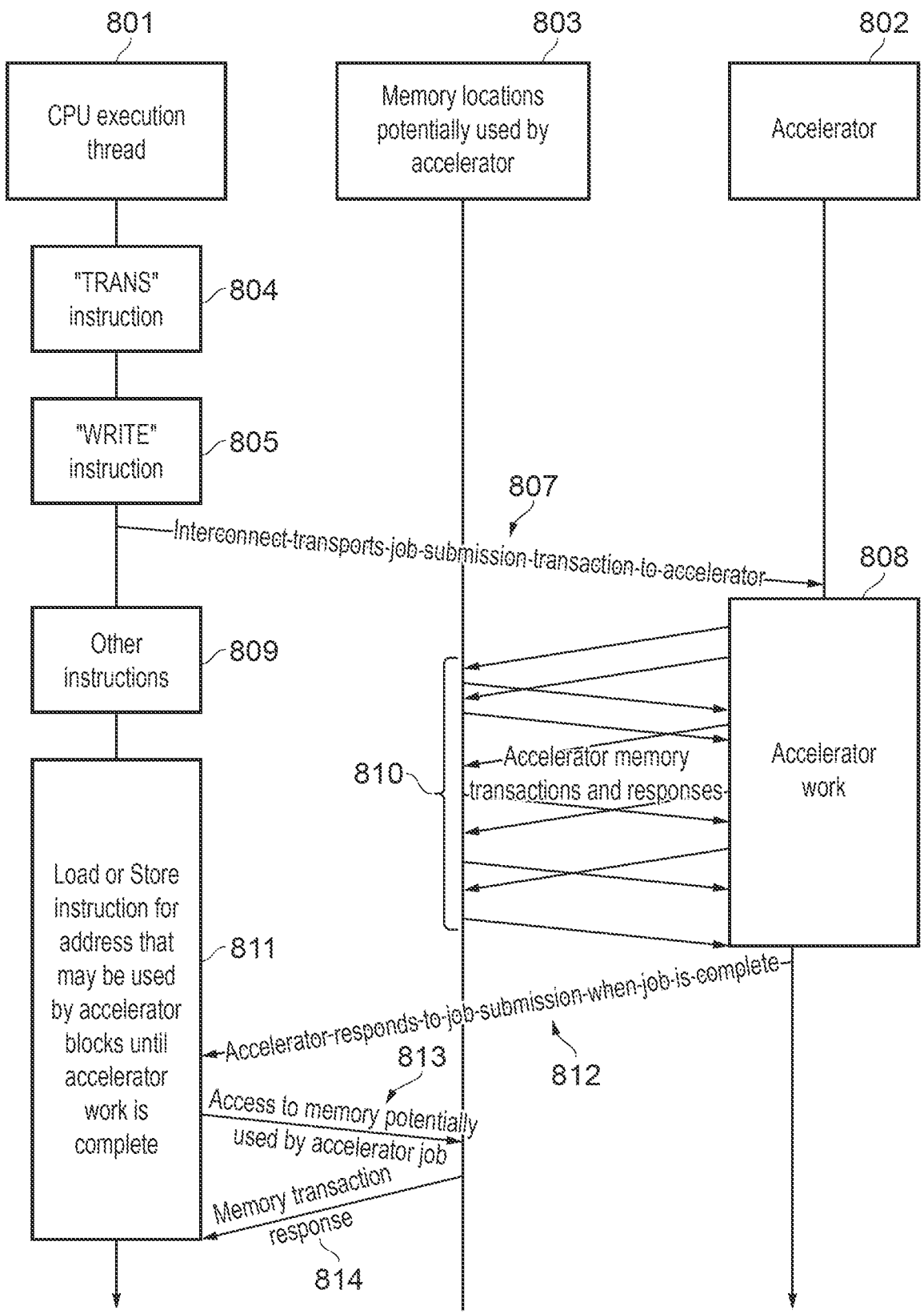
FIG. 10 schematically illustrates the interplay between a CPU execution thread and the operation of an accelerator.

FIG. 10 schematically illustrates the interplay between a CPU execution thread 801 and the operation of an accelerator 802 in a data processing system in some examples. Schematically, a set of memory locations 803 potentially be used by the accelerator are also shown. In the CPU execution thread 701 a pair of job submissions instruction (i.e. the "step-by-step" instructions TRANS and WRITE described above) is encountered (804, then 805) and as a result the interconnect transports (807) a job submission transaction to the accelerator, causing the accelerator to perform (808) the specified accelerator work (delegated task). In the interim the CPU execution thread 801 continues with the execution of other instructions (809). The accelerator work 808 comprises various accelerator memory transactions and responses 810 to a number of the memory locations 803 to which the accelerator is given access as part of the job submission transaction. In the interim when a load or store instruction is encountered (811) for an address that may be used by the accelerator 802 in the execution of the accelerator work 808, the memory access of that load or store instruction is blocked until the accelerator work is complete. When the accelerator work 808 is complete the accelerator responds (812) to the job submission. At this point the memory access 813 (for the blocked load or store instruction) may proceed and the memory transaction response 814 then allows this load or store instruction to complete.

Figure 11:
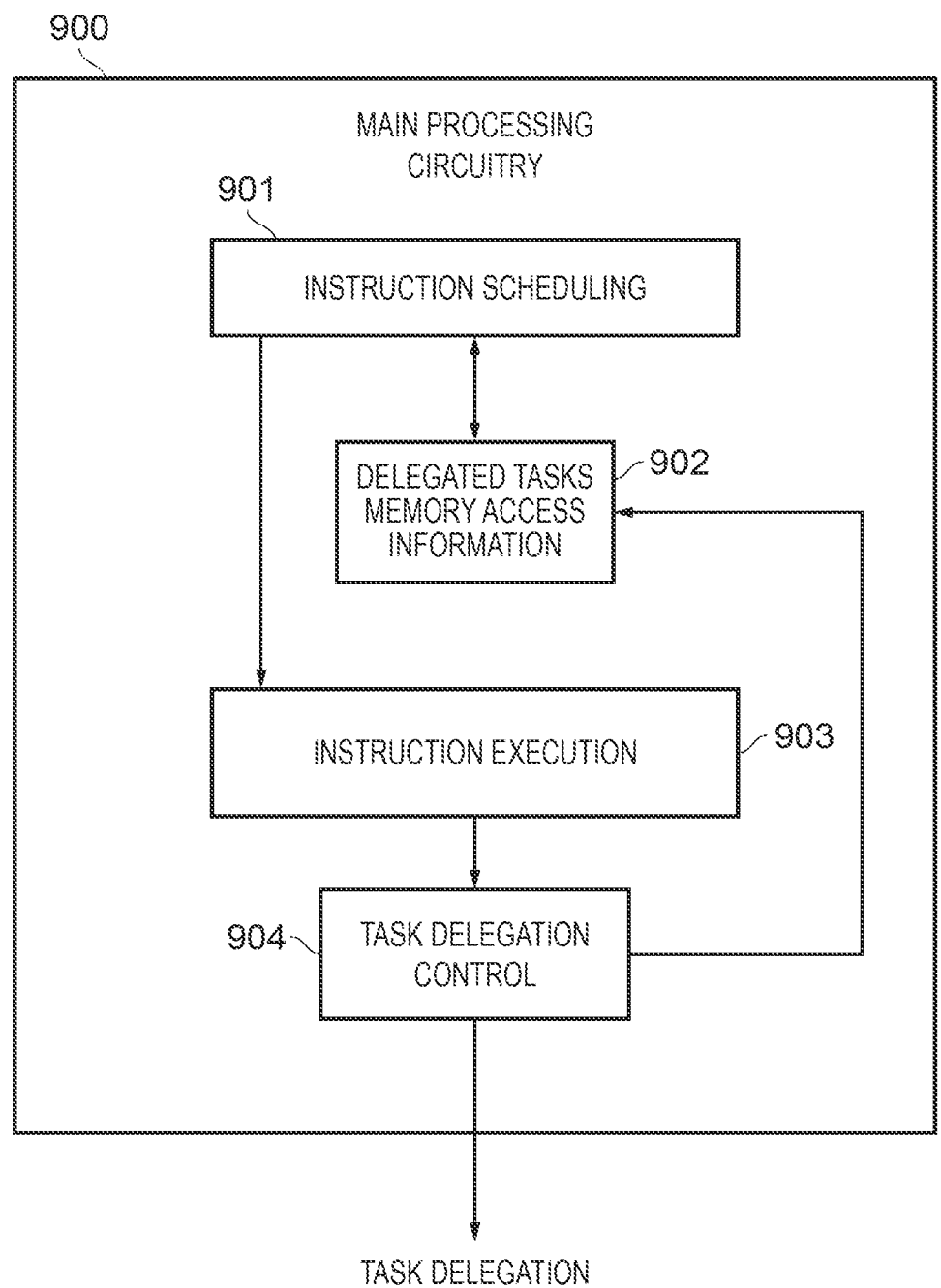
FIG. 11 schematically illustrates example main processing circuitry.

FIG. 11 schematically illustrates main processing circuitry (such as a CPU) 900 in some examples. Instruction scheduling circuitry 901 is configured to receive decoded instructions from earlier in a processor pipeline (not shown) and to schedule instructions for execution in accordance with the readiness of those instructions for execution (e.g. that their source operands are locally available and other instructions the result of which they depend on have completed before them). Additionally according to the present techniques storage 902 for information relating to memory accesses of delegated tasks is provided which the instruction scheduling circuitry 901 makes reference to in scheduling instructions for the instruction execution circuitry 903. Task delegation instructions on execution cause information to be passed to the task delegation control 904, which not only administers the generation of the necessary write transactions which are then transmitted to implement the task delegation, but also updates the content of the delegated tasks memory access information storage 902 to store various information in support of the present techniques as further outlined below.

Thus the present techniques further recognise that the possibility arises for the definition of the memory set of locations potentially used by the accelerator 803 to encompass notably more memory addresses than will actually require access blocking whilst the delegated accelerator work is carried out. For example, a common case will be that an accelerator only performs read transactions for some memory regions. For these regions read transactions do not need to be ordered and accelerator read only region store conditions only apply to CPU writes. Thus corresponding information relating to the memory regions and whether each with be read-only or will also require write access is held in delegated tasks memory access information storage 902. However even applying these conditions nevertheless unnecessary performance restrictions may be imposed due to store instructions that access memory locations in pages used for accelerator work but at locations within those pages which are not used for accelerator work. It can also prevent the issuance of multiple accelerator jobs using the same page. However by tracking the size of each memory region access by the accelerator for a pointer, the enforcement of the ordering can be implemented in a more fine grained manner and avoid unnecessary stalling. Thus more fine-grained about the memory addresses which will be accessed (not only the memory pages) can be stored in delegated tasks memory access information storage 902 to support this.

Another approach proposed here is to consider accelerator work to be a separate thread of execution and require the use of barrier instructions synchronise the CPU execution thread with the accelerator task completion. This requires software to explicitly manage the ordering of CPU execution with accelerator submission and task completion, however can allow for greater parallelization and throughput.

A further proposed feature that can help avoid stalling is to support multiple barrier groups. Each accelerator task is assigned a barrier group on submission. The barrier group is specified in the instruction (immediate or in register). Barrier instructions can then wait for all tasks, for a subset of barrier groups, or a single barrier group. This allows efficient submission and synchronization of different types of tasks that have different latencies for completing or operate on different sized data blocks. Thus the delegated tasks memory access information storage 902 can also hold information specifying the barrier group to which a delegated task belongs, in order to only stall those instructions affected by that barrier group.

These approaches each have merit and there are cases where each may be preferable. For example, an accelerator implementing a memcopy operation can more easily be integrated in libraries (e.g. a std C library) if no explicit barrier instructions are needed for synchronization, whereas implementing a filter kernel on a compressed frame buffer using an accelerator for accessing compressed data can likely achieve higher performance when explicitly managing synchronization with barrier instructions. A complementary approach further proposed here is to combine the two approaches above and specify in the job submission instruction how a task is synchronized:

For the "all-in-one" approach the job submission instruction also includes information for each valid PA pointer whether it should be included in the CPU execution thread memory transaction order, and optionally whether the page will be written to by the accelerator task.

For the "step-by-step" approach the "TRANS" transaction also specifies information on whether the pointer should be included in the CPU execution thread memory transaction order, and optionally whether the page will be written to by the accelerator task.

In short, the identification of valid PA pointers in the job submission can also be extended to also specify whether accesses by the accelerator to the page the pointer references should be included in the CPU execution thread memory transaction order. This information is only used by the CPU though and does not need to be transferred to the accelerator.

In the event that there is modification of the virtual memory mappings, it is recognised herein that this will require system wide synchronization. This includes completion of all accelerator tasks affected by the change in virtual memory mappings. In other words, the response to a received distributed virtual memory (DVM) synch message applicable to the accelerator task needs to be delayed until accelerator tasks submitted earlier complete. The delay of a DVM response to applicable DVM synch messages applies from the start of the translation for the accelerator task, i.e. from the first TLB lookup for the first translation used by the accelerator task. As an accelerator task will only access memory pages indicated in the task submission, it is also possible to track memory pages in use (in the delegated tasks memory access information storage 902) to support this and only stall responses to DVM messages that involve memory pages actually in use by the accelerator.

Finally there follows an example of how an accelerator can be used in parallel with CPU execution to enable the use of compressed data. A compressed frame buffer consisting of N tiles is processed tile by tile using 3 buffers. The result is written back to the same place. Tile j is always processed using buffer j %3. Compression happens in parallel with CPU execution. The functions employed in the pseudo code example are:

decompress_tile( )—decompress a frame buffer tile to a buffer. Submits accelerator job(s) to decompress the tile.

compress_tile( )—compress a buffer to a frame buffer tile. Submits accelerator job(s) to compress the tile.

process_buffer( )—do the filter on a buffer.

sync( )—CPU memory barrier and wait for completion of accelerator memory compression operations.

High-level pseudo code example to illustrate the principle:

```
int ind = 0;
int decomp_tile, comp_tile, proc_tile;
do {
    decomp_tile = ind;              // Tile to decompress proc_tile =
    decomp_tile -1; // Tile to process
    comp_tile = proc_tile -1;       // Tile to write back
    if ((decomp_tile >= 0) && (decomp_tile < N))
    decompress_tile(decomp_tile);
    if ((comp_tile >= 0) && (comp_tile < N)) compress_tile(comp_tile);
    // The compress & decompress operations are performed in parallel by
the accelerator
    if ((proc_tile >= 0) && (proc_tile < N)) process_buffer(proc_tile%3);
// Process the tile
    ind++;
    sync( ); // Synchronize CPU and accelerator
} while (ind<(N+2));
```

Various configurations disclosed herein are defined in the following numbered clauses:

Clause 1. Apparatus comprising:
    main processing circuitry responsive to user-specified instructions to perform data processing operations; and
    an interconnect interface for connecting the main processing circuitry to an interconnect via which the main processing circuitry can communicate with memory,
    wherein the user-specified instructions comprise a task dispatch specification, the task dispatch specification comprising:
        an indication of auxiliary processing circuitry, wherein the auxiliary processing circuitry is external to the main processing circuitry and is connected to the interconnect; and
        multiple data words defining a task to be carried out by the auxiliary processing circuitry, wherein the multiple data words comprise at least one virtual address indicator,
    wherein the main processing circuitry is responsive to the task dispatch specification:
        to perform virtual-to-physical address translation with respect to the at least one virtual address indicator to derive at least one physical address indicator; and
        to issue a task dispatch memory write transaction via the interconnect interface, wherein the task dispatch memory write transaction comprises:
            the indication of the auxiliary processing circuitry; and
            the multiple data words, wherein the at least one virtual address indicator in the multiple data words is substituted by the at least one physical address indicator.

Clause 2. The apparatus as defined in clause 1, wherein the task dispatch specification specifies a plurality of registers associated with the main processing circuitry and wherein the main processing circuitry is responsive to the task dispatch specification to perform the virtual-to-physical address translation on content of a subset of the plurality of registers.

Clause 3. The apparatus as defined in clause 2, wherein a multiplicity of the plurality of registers is dependent on at least one of:
    an immediate value specified in the task dispatch specification;

content of a multiplicity definition register specified in the task dispatch specification;

a bitmask indicated by the task dispatch specification; and an enumerated set of options for the multiplicity, wherein the task dispatch specification specifies one of the enumerated set of options.

Clause 4. The apparatus as defined in clause 2, wherein a size of the subset of the plurality of registers which is subjected to the virtual-to-physical address translation is specified in the task dispatch specification.

Clause 5. The apparatus as defined in clause 4, wherein the size of the subset of the plurality of registers is dependent on at least one of:

an immediate value specified in the task dispatch specification;

content of a multiplicity definition register specified in the task dispatch specification;

a bitmask indicated by the task dispatch specification; and an enumerated set of options for the multiplicity, wherein the task dispatch specification specifies one of the enumerated set of options.

Clause 6. The apparatus as defined in clause 1, wherein the at least one virtual address indicator is at least one virtual address pointer and the task dispatch specification comprises a specification of a size of at least one memory region referenced by the at least one virtual address pointer.

Clause 7. The apparatus as defined in clause 6, wherein the specification of the size of the memory region referenced by the at least one virtual address pointer comprises at least one of:

an immediate value specified in the task dispatch specification;

content of a memory region size specification register specified in the task dispatch specification;

a bitmask indicated by the task dispatch specification; and an enumerated set of options for the size, wherein the task dispatch specification specifies one of the enumerated set of options.

Clause 8. The apparatus as defined in clause 6, wherein when the at least one memory region comprises a multi-page memory region which crosses at least one virtual memory page boundary, the virtual-to-physical address translation generates more than one physical address page indication corresponding to the multi-page memory region, and the task dispatch memory write transaction comprises the more than one physical address page indication.

Clause 9. The apparatus as defined in clause 1, wherein the user-specified instructions comprise a zero-translate task dispatch specification, the zero-translate task dispatch specification comprising:

the indication of auxiliary processing circuitry; and further multiple data words defining a further task to be carried out by the auxiliary processing circuitry, wherein the main processing circuitry is responsive to the zero-translate task dispatch specification:

to issue a further task dispatch memory write transaction via the interconnect interface, wherein the further task dispatch memory write transaction comprises:

the indication of the auxiliary processing circuitry; and the multiple data words.

Clause 10. The apparatus as defined in clause 1, wherein the user-specified instructions comprise a task dispatch instruction which specifies the task dispatch specification, and wherein the main processing circuitry is responsive to the task dispatch instruction to perform the virtual-to-physical address translation and to issue the task dispatch memory write transaction via the interconnect interface.

Clause 11. The apparatus as defined in clause 1, wherein the user-specified instructions comprise a task translation instruction and a task write instruction which together specify the task dispatch specification, and wherein the main processing circuitry is responsive to the task translation instruction to perform the virtual-to-physical address translation and is responsive to the task write instruction to issue the task dispatch memory write transaction via the interconnect interface.

Clause 12. The apparatus as defined in clause 11, wherein the user-specified instructions comprise multiple task translation instructions and the task write instruction.

Clause 13. The apparatus as defined in clause 11, wherein when performing the virtual-to-physical address translation the main processing circuitry is arranged to store the at least one physical address indicator in a register.

Clause 14. The apparatus as defined in clause 11, wherein when performing the virtual-to-physical address translation the main processing circuitry is arranged to store the at least one physical address indicator in a task dispatch buffer.

Clause 15. The apparatus as defined in clause 11, wherein the main processing circuitry is arranged to perform the data processing operations in response to the user-specified instructions in a user mode, and wherein the main processing circuitry is responsive to the task translation instruction to exit the user mode and enter a restricted mode, wherein the virtual-to-physical address translation is performed in the restricted mode and cannot be performed in the user mode.

Clause 16. The apparatus as defined in clause 15, wherein when the main processing circuitry is in the restricted mode at least one register into which the at least one physical address indicator resulting from the virtual-to-physical address translation is written cannot be read by instructions other than the task write instruction.

Clause 17. The apparatus as defined in clause 15, wherein the main processing circuitry is responsive to exiting the restricted mode to erase content of the at least one register into which the at least one physical address indicator resulting from the virtual-to-physical address translation is written.

Clause 18. The apparatus as defined in clause 15, wherein the main processing circuitry is responsive to:

any instruction other than the task translation instruction or the task write instruction; and/or a predefined maximum number of instructions having been executed in the restricted mode, to exit the restricted mode.

Clause 19. The apparatus as defined in clause 15, wherein the main processing circuitry is responsive to entering the restricted mode to store a processing state checkpoint, and wherein the main processing circuitry is responsive to occurrence of a translation fault or an exception in the restricted mode to cause a processing restart from the processing state checkpoint.

Clause 20. The apparatus as defined in clause 1, wherein the main processing circuitry is further responsive to the task dispatch specification:

to stall access to memory locations corresponding to the at least one physical address indicator by other subsequent processes until a task completion notification corresponding to the task dispatch memory write transaction has been received from the auxiliary processing circuitry; and/or to stall issuance of the task dispatch memory write transaction via the interconnect interface until access to memory locations corresponding to the at least one physical address indicator by other processes has completed.

Clause 21. The apparatus as defined in clause 20, wherein the at least one virtual address indicator is at least one virtual address pointer and the task dispatch specification comprises a specification of a size of at least one memory region referenced by the at least one virtual address pointer, and wherein the main processing circuitry is further responsive to the task dispatch specification to limit definitions of the memory locations corresponding to the at least one virtual address indicator in dependence on the size of the at least one memory region referenced.

Clause 22. The apparatus as defined in clause 1, wherein the main processing circuitry is responsive to a barrier instruction following the task dispatch specification in the user-specified instructions to stall execution of further instructions until a task completion notification corresponding to the task dispatch memory write transaction has been received from the auxiliary processing circuitry.

Clause 23. The apparatus as defined in clause 1, wherein the task dispatch specification further comprises an indication for each at least one physical address indicator to be derived for the task dispatch memory write transaction of whether or not that physical address indicator is to be included in a memory transaction ordering control performed by the main processing circuitry.

Clause 24. The apparatus as defined in clause 1, wherein the main processing circuitry is responsive to a distributed virtual memory synchronization message received via the interconnect interface to delay issuing a response to the distributed virtual memory synchronization message until a task completion notification corresponding to the task dispatch memory write transaction has been received from the auxiliary processing circuitry.

Clause 25. A method comprising:
 performing data processing operations in main processing circuitry in response to user-specified instructions,
 wherein the user-specified instructions comprise a task dispatch specification, the task dispatch specification comprising:
  an indication of auxiliary processing circuitry, wherein the auxiliary processing circuitry is external to the main processing circuitry and is connected to the processing circuitry via an interconnect; and
  multiple data words defining a task to be carried out by the auxiliary processing circuitry, wherein the multiple data words comprise at least one virtual address indicator;
 and in response to the task dispatch specification:
  performing virtual-to-physical address translation with respect to the at least one virtual address indicator to derive at least one physical address indicator; and
  issuing a task dispatch memory write transaction via the interconnect, wherein the task dispatch memory write transaction comprises:
   the indication of the auxiliary processing circuitry; and
   the multiple data words, wherein the at least one virtual address indicator in the multiple data words is substituted by the at least one physical address indicator.

Clause 26. An interconnect for connecting main processing circuitry to auxiliary processing circuitry,
 wherein the interconnect is arranged to convey to the auxiliary processing circuitry a task dispatch memory write transaction issued by the main processing circuitry, wherein the task dispatch memory write transaction comprises:
  an indication of the auxiliary processing circuitry; and
  multiple data words defining a task to be carried out by the auxiliary processing circuitry, wherein the multiple data words comprise at least one physical address indicator,
 wherein the interconnect is responsive to the task dispatch memory write transaction, when the at least one physical address indicator is comprised in write data to be written to a target location which is read-accessible, to reject the task dispatch memory write transaction.

In brief overall summary apparatuses and methods are disclosed for performing data processing operations in main processing circuitry and delegating certain tasks to auxiliary processing circuitry. User-specified instructions executed by the main processing circuitry comprise a task dispatch specification specifying an indication of the auxiliary processing circuitry and multiple data words defining a delegated task comprising at least one virtual address indicator. In response to the task dispatch specification the main processing circuitry performs virtual-to-physical address translation with respect to the at least one virtual address indicator to derive at least one physical address indicator, and issues a task dispatch memory write transaction to the auxiliary processing circuitry comprises the indication of the auxiliary processing circuitry and the multiple data words, wherein the at least one virtual address indicator in the multiple data words is substituted by the at least one physical address indicator.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. Apparatus comprising:
 main processing circuitry responsive to user-specified instructions to perform data processing operations; and
 an interconnect interface for connecting the main processing circuitry to an interconnect via which the main processing circuitry can communicate with memory,
 wherein the user-specified instructions comprise a task dispatch specification, the task dispatch specification comprising:
  an indication of auxiliary processing circuitry, wherein the auxiliary processing circuitry is external to the main processing circuitry and is connected to the interconnect; and
  multiple data words defining a task to be carried out by the auxiliary processing circuitry, wherein the multiple data words comprise at least one virtual address indicator, wherein the main processing circuitry is responsive to the task dispatch specification:
to perform virtual-to-physical address translation with respect to the at least one virtual address indicator to derive at least one physical address indicator; and
to issue a task dispatch memory write transaction via the interconnect interface, wherein the task dispatch memory write transaction comprises:
the indication of the auxiliary processing circuitry; and
the multiple data words, wherein the at least one virtual address indicator in the multiple data words is substituted by the at least one physical address indicator.

2. The apparatus as claimed in claim 1, wherein the task dispatch specification specifies a plurality of registers associated with the main processing circuitry and wherein the main processing circuitry is responsive to the task dispatch specification to perform the virtual-to-physical address translation on content of a subset of the plurality of registers.

3. The apparatus as claimed in claim 2, wherein a multiplicity of the plurality of registers is dependent on at least one of:
an immediate value specified in the task dispatch specification;
content of a multiplicity definition register specified in the task dispatch specification;
a bitmask indicated by the task dispatch specification; and
an enumerated set of options for the multiplicity, wherein the task dispatch specification specifies one of the enumerated set of options.

4. The apparatus as claimed in claim 2, wherein a size of the subset of the plurality of registers which is subjected to the virtual-to-physical address translation is specified in the task dispatch specification.

5. The apparatus as claimed in claim 1, wherein the at least one virtual address indicator is at least one virtual address pointer and the task dispatch specification comprises a specification of a size of at least one memory region referenced by the at least one virtual address pointer.

6. The apparatus as claimed in claim 5, wherein when the at least one memory region comprises a multi-page memory region which crosses at least one virtual memory page boundary, the virtual-to-physical address translation generates more than one physical address page indication corresponding to the multi-page memory region, and the task dispatch memory write transaction comprises the more than one physical address page indication.

7. The apparatus as claimed in claim 1, wherein the user-specified instructions comprise a zero-translate task dispatch specification, the zero-translate task dispatch specification comprising:
the indication of auxiliary processing circuitry; and
further multiple data words defining a further task to be carried out by the auxiliary processing circuitry,
wherein the main processing circuitry is responsive to the zero-translate task dispatch specification:
to issue a further task dispatch memory write transaction via the interconnect interface, wherein the further task dispatch memory write transaction comprises:
the indication of the auxiliary processing circuitry; and
the multiple data words.

8. The apparatus as claimed in claim 1, wherein the user-specified instructions comprise a task dispatch instruction which specifies the task dispatch specification, and wherein the main processing circuitry is responsive to the task dispatch instruction to perform the virtual-to-physical address translation and to issue the task dispatch memory write transaction via the interconnect interface.

9. The apparatus as claimed in claim 1, wherein the user-specified instructions comprise a task translation instruction and a task write instruction which together specify the task dispatch specification, and wherein the main processing circuitry is responsive to the task translation instruction to perform the virtual-to-physical address translation and is responsive to the task write instruction to issue the task dispatch memory write transaction via the interconnect interface.

10. The apparatus as claimed in claim 9, wherein when performing the virtual-to-physical address translation the main processing circuitry is arranged to store the at least one physical address indicator in a task dispatch buffer.

11. The apparatus as claimed in claim 9, wherein the main processing circuitry is arranged to perform the data processing operations in response to the user-specified instructions in a user mode, and wherein the main processing circuitry is responsive to the task translation instruction to exit the user mode and enter a restricted mode,
wherein the virtual-to-physical address translation is performed in the restricted mode and cannot be performed in the user mode.

12. The apparatus as claimed in claim 11, wherein when the main processing circuitry is in the restricted mode at least one register into which the at least one physical address indicator resulting from the virtual-to-physical address translation is written cannot be read by instructions other than the task write instruction.

13. The apparatus as claimed in claim 11, wherein the main processing circuitry is responsive to:
any instruction other than the task translation instruction or the task write instruction; and/or
a predefined maximum number of instructions having been executed in the restricted mode,
to exit the restricted mode.

14. The apparatus as claimed in claim 11, wherein the main processing circuitry is responsive to entering the restricted mode to store a processing state checkpoint, and wherein the main processing circuitry is responsive to occurrence of a translation fault or an exception in the restricted mode to cause a processing restart from the processing state checkpoint.

15. The apparatus as claimed in claim 1, wherein the main processing circuitry is further responsive to the task dispatch specification:
to stall access to memory locations corresponding to the at least one physical address indicator by other subsequent processes until a task completion notification corresponding to the task dispatch memory write transaction has been received from the auxiliary processing circuitry; and/or
to stall issuance of the task dispatch memory write transaction via the interconnect interface until access to memory locations corresponding to the at least one physical address indicator by other processes has completed.

16. The apparatus as claimed in claim 15, wherein the at least one virtual address indicator is at least one virtual address pointer and the task dispatch specification comprises a specification of a size of at least one memory region referenced by the at least one virtual address pointer, and wherein the main processing circuitry is further responsive to the task dispatch specification to limit definitions of the memory locations corresponding to the at least one virtual address indicator in dependence on the size of the at least one memory region referenced.

17. The apparatus as claimed in claim 1, wherein the task dispatch specification further comprises an indication for each at least one physical address indicator to be derived for the task dispatch memory write transaction of whether or not that physical address indicator is to be included in a memory transaction ordering control performed by the main processing circuitry.

18. The apparatus as claimed in claim 1, wherein the main processing circuitry is responsive to a distributed virtual memory synchronization message received via the interconnect interface to delay issuing a response to the distributed virtual memory synchronization message until a task completion notification corresponding to the task dispatch memory write transaction has been received from the auxiliary processing circuitry.

19. A method comprising:
   performing data processing operations in main processing circuitry in response to user- specified instructions,
   wherein the user-specified instructions comprise a task dispatch specification, the task dispatch specification comprising:
      an indication of auxiliary processing circuitry, wherein the auxiliary processing circuitry is external to the main processing circuitry and is connected to the processing circuitry via an interconnect; and
      multiple data words defining a task to be carried out by the auxiliary processing circuitry, wherein the multiple data words comprise at least one virtual address indicator;
   and in response to the task dispatch specification:
      performing virtual-to-physical address translation with respect to the at least one virtual address indicator to derive at least one physical address indicator; and
      issuing a task dispatch memory write transaction via the interconnect, wherein the task dispatch memory write transaction comprises:
         the indication of the auxiliary processing circuitry; and
         the multiple data words, wherein the at least one virtual address indicator in the multiple data words is substituted by the at least one physical address indicator.

20. An interconnect for connecting main processing circuitry to auxiliary processing circuitry,
   wherein the interconnect is arranged to convey to the auxiliary processing circuitry a task dispatch memory write transaction issued by the main processing circuitry, wherein the task dispatch memory write transaction comprises:
      an indication of the auxiliary processing circuitry; and
      multiple data words defining a task to be carried out by the auxiliary processing circuitry, wherein the multiple data words comprise at least one physical address indicator,
   wherein the interconnect is responsive to the task dispatch memory write transaction, when the at least one physical address indicator is comprised in write data to be written to a target location which is read-accessible, to reject the task dispatch memory write transaction.

* * * * *